(12) United States Patent
Nishizawa et al.

(10) Patent No.: US 10,760,908 B2
(45) Date of Patent: Sep. 1, 2020

(54) VIBRATION DEVICE, ANGULAR VELOCITY SENSOR, ELECTRONIC DEVICE, AND VEHICLE

(71) Applicant: Seiko Epson Corporation, Tokyo (JP)

(72) Inventors: Ryuta Nishizawa, Matsumoto (JP); Shiro Murakami, Shiojiri (JP); Keiichi Yamaguchi, Ina (JP); Keiji Nakagawa, Minowa (JP)

(73) Assignee: Seiko Epson Corporation (JP)

( * ) Notice: Subject to any disclaimer, the term of this patent is extended or adjusted under 35 U.S.C. 154(b) by 244 days.

(21) Appl. No.: 15/928,472

(22) Filed: Mar. 22, 2018

(65) Prior Publication Data

US 2018/0274922 A1    Sep. 27, 2018

(30) Foreign Application Priority Data

Mar. 23, 2017  (JP) .................................. 2017-058170

(51) Int. Cl.

| | |
|---|---|
| *G01C 19/5621* | (2012.01) |
| *G01C 19/5628* | (2012.01) |
| *G01C 19/5656* | (2012.01) |
| *G01C 19/5663* | (2012.01) |
| *G01C 19/56* | (2012.01) |
| *B60G 17/019* | (2006.01) |

(52) U.S. Cl.
CPC ... *G01C 19/5663* (2013.01); *B60G 17/01933* (2013.01); *G01C 19/56* (2013.01); *G01C 19/5621* (2013.01); *G01C 19/5628* (2013.01); *G01C 19/5656* (2013.01); *B60G 17/01941* (2013.01); *B60G 2401/10* (2013.01)

(58) Field of Classification Search
CPC ........................ G01C 19/5628; G01C 19/5663
See application file for complete search history.

(56) References Cited

U.S. PATENT DOCUMENTS

| | | | |
|---|---|---|---|
| 2005/0284223 A1 | 12/2005 | Karaki et al. | |
| 2011/0010924 A1* | 1/2011 | Berger | .................. B81B 7/0058 |
| | | | 29/592.1 |

(Continued)

FOREIGN PATENT DOCUMENTS

| | | |
|---|---|---|
| JP | 02-261210 A | 10/1990 |
| JP | 2005-051513 A | 2/2005 |

(Continued)

*Primary Examiner* — Herbert K Roberts
(74) *Attorney, Agent, or Firm* — Harness, Dickey & Pierce, P.L.C.

(57) ABSTRACT

A vibration device includes a vibration element that has a plurality of terminals, a base that has a plurality of electrical connection terminals, and a board that has a wiring portion which electrically connects the plurality of electrical connection terminal and the plurality of terminals to each other, and that supports the vibration element with respect to the base. The board has a base fixing portion fixed to the base, a vibration element mounting portion on which the vibration element is mounted, and at least one beam portion which couples the base fixing portion and the vibration element mounting portion to each other. At least the one beam portion has a first portion which extends in a first direction and a second portion which extends in a second direction intersecting the first direction.

20 Claims, 22 Drawing Sheets

(56) References Cited

U.S. PATENT DOCUMENTS

| | | | | |
|---|---|---|---|---|
| 2012/0318059 A1* | 12/2012 | Otsuki | ................ | H01L 23/057 |
| | | | | 73/504.12 |
| 2014/0238131 A1 | 8/2014 | Yoshiuchi et al. | | |
| 2015/0300820 A1* | 10/2015 | Uchida | .............. | G01C 19/5628 |
| | | | | 73/504.16 |
| 2016/0116285 A1 | 4/2016 | Ogura et al. | | |

FOREIGN PATENT DOCUMENTS

| JP | 2005-062160 A | 3/2005 |
|---|---|---|
| JP | 2007-316090 A | 12/2007 |
| JP | 2008-058258 A | 3/2008 |
| JP | 2009-302701 A | 12/2009 |
| JP | 2010-223774 A | 10/2010 |
| JP | 2014-089049 A | 5/2014 |
| JP | 5729551 B2 | 6/2015 |
| JP | 2016-085176 A | 5/2016 |
| JP | 2016-085178 A | 5/2016 |
| JP | 5927434 B2 | 6/2016 |
| JP | 2016-176763 A | 10/2016 |

\* cited by examiner

VIBRATION DEVICE, ANGULAR VELOCITY SENSOR, ELECTRONIC DEVICE, AND VEHICLE

BACKGROUND

1. Technical Field

The present invention relates to a vibration device, an angular velocity sensor, an electronic device, and a vehicle.

2. Related Art

In the related art, a physical quantity detection device is known, which detects a physical quantity such as angular velocity and acceleration by using a vibration element such as a piezoelectric vibrator and a micro electromechanical systems (MEMS) vibrator.

As an example of this physical detection device, for example, JP-A-2014-089049 discloses an angular velocity sensor including an angular velocity detection element made of silicon or quartz crystal, a package configured to include ceramic, and a fixing frame that holds the angular velocity detection element with respect to the package. The fixing frame has a torsion spring and a balancer. According to the angular velocity sensor disclosed in JP-A-2014-089049, the torsion spring and the balancer reduce outward leaking vibrations of the angular velocity detection element. According to the angular velocity sensor disclosed in JP-A-2014-089049, the fixing frame is configured to include a metal material such as a stainless steel alloy and an iron nickel cobalt alloy, thereby suppressing translational movement in a thickness direction of the angular velocity detection element.

However, according to the angular velocity sensor disclosed in JP-A-2014-089049, due to a structure of the fixing frame which supports the angular velocity detection element, thermal stress generated in the package or stress generated from the package receiving impact is unavoidably transmitted to the angular velocity detection element. As a result, there is a problem in that a vibration characteristic varies and a zero point voltage of an output signal varies.

SUMMARY

An advantage of some aspects of the invention is to provide a vibration device which reduces variations in vibration characteristics, an angular velocity sensor including the vibration device and preventing poor detection accuracy, and an electronic device and a vehicle which include the vibration device.

The invention can be implemented as the following configurations.

A vibration device according to an application example includes a vibration element that has a plurality of terminals, abase that has a plurality of electrical connection terminals, and a board that has a wiring portion which electrically connects the plurality of electrical connection terminals and the plurality of terminals to each other, and that supports the vibration element with respect to the base. The board has a base fixing portion fixed to the base, a vibration element mounting portion on which the vibration element is mounted, and at least one beam portion which couples the base fixing portion and the vibration element mounting portion to each other. At least the one beam portion has a first portion which extends in a first direction and a second portion which extends in a second direction intersecting the first direction.

According to this vibration device, the vibration device includes the board having the first portion and the second portion which intersect each other. In this manner, deformation of the base due to an external force (for example, thermal stress or impact) can be absorbed or suppressed by the beam portion. Accordingly, deformation of the vibration element mounting portion can be reduced in a case where the base is deformed. Therefore, a state where the vibration element is held by the vibration element mounting portion does not greatly vary, or variations in the holding state can be reduced. Therefore, it is possible to reduce variations in a vibration characteristics of the vibration element mounted on the vibration element mounting portion.

In the vibration device according to the application example, it is preferable that the board includes an insulating material.

With this configuration, it is possible to reduce possibilities that thermal stress may be generated between the base and the vibration element. It is possible to easily insulate a plurality of wires included in the wiring portion from each other.

In the vibration device according to the application example, it is preferable that the base is an electronic component which includes a circuit for driving the vibration element.

According to this configuration, a force applied to the electronic component due to the base deformed by the external force can be absorbed or suppressed by the board. Therefore, it is possible to reduce variations in the vibration characteristics of the vibration element mounted on the vibration element mounting portion.

In the vibration device according to the application example, it is preferable that the base includes an electronic component which includes a circuit for driving the vibration element, and a stress relaxation portion which has a wiring layer disposed between the electronic component and the board and electrically connecting the electronic component and the wiring portion to each other.

With this configuration, the external force applied to the electronic component can be absorbed by the stress relaxation portion. Therefore, it is possible to reduce possibilities that the external force may be transmitted to the vibration element.

In the vibration device according to the application example, it is preferable that in the board, in a plan view, the base fixing portion and the beam portion configure a first frame body which surrounds the vibration element mounting portion.

With this configuration, it is possible to lengthen a transmission route of the stress generated due to the base deformed by the external force. Thus, even if the base is deformed by the external force, the deformation (distortion) can be effectively absorbed or suppressed by the first frame body. Accordingly, the deformation of the vibration element can be more effectively reduced. Therefore, it is possible to further reduce variations in the vibration characteristics of the vibration element mounted on the vibration element mounting portion.

In the vibration device according to the application example, it is preferable that in a plan view, the board has a second frame body which is located between the first frame body and the vibration element mounting portion.

With this configuration, it is possible to lengthen the transmission route of the stress generated due to the package deformed by the external force. Thus, even if the base is deformed by the external force, the deformation can be more effectively absorbed or suppressed by the first frame body and the second frame body. Therefore, it is possible to more effectively reduce variations in the vibration characteristics of the vibration element mounted on the vibration element mounting portion.

In the vibration device according to the application example, it is preferable that the board has a plurality of the first portions and a plurality of the second portions, and that the first portions and the second portions are alternately coupled to each other.

With this configuration, it is possible to lengthen the transmission route of the stress generated due to the base deformed by the external force. Therefore, it is possible to more effectively reduce variations in the vibration characteristics of the vibration element mounted on the vibration element mounting portion.

In the vibration device according to the application example, it is preferable that the wiring portion has shield wiring which is electrically connected to a constant potential.

With this configuration, it is possible to reduce capacitance between the vibration element, and the wiring layer and the electronic component (IC chip) which are formed on the base, for example. Therefore, an S/N ratio is improved, and thus, it is possible to realize the vibration device which can more accurately detect angular velocity.

An angular velocity sensor according to an application example includes the vibration device.

According to this angular velocity sensor, there is provided the vibration device in which variations in the vibration characteristics are reduced. Therefore, it is possible to achieve excellent reliability.

An electronic device according to an application example includes the vibration device.

According to this electronic device, there is provided the vibration device in which variations in the vibration characteristics are reduced. Therefore, it is possible to achieve excellent reliability.

A vehicle according to an application example includes the vibration device.

According to this vehicle, there is provided the vibration device in which variations in the vibration characteristics are reduced. Therefore, it is possible to achieve excellent reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a vibration device, an angular velocity sensor, an electronic device, and a vehicle according to the invention will be described in detail with reference to embodiments illustrated in the accompanying drawings. Some locations in each drawing are illustrated by being appropriately enlarged or reduced so that portions described herein can be recognized.

1. Vibration Device

First, a vibration device according to the present application examples will be described.

First Embodiment

Figure 1:
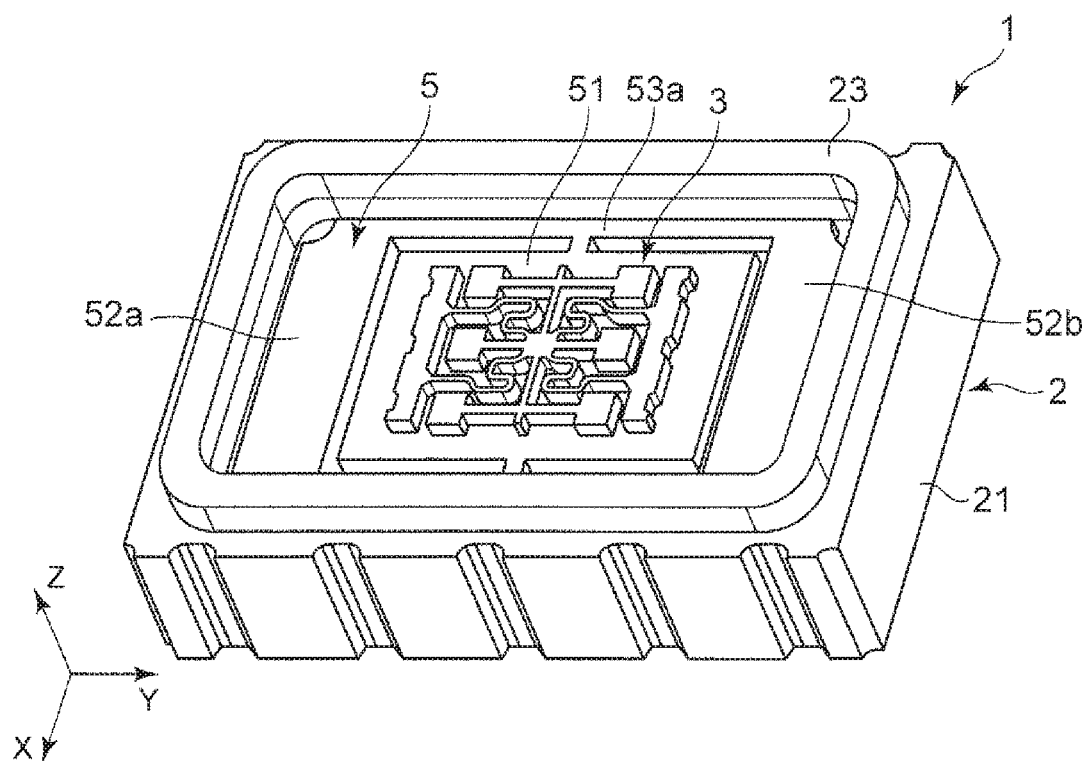
FIG. 1 is a perspective view illustrating a vibration device according to a first embodiment.
Figure 2:
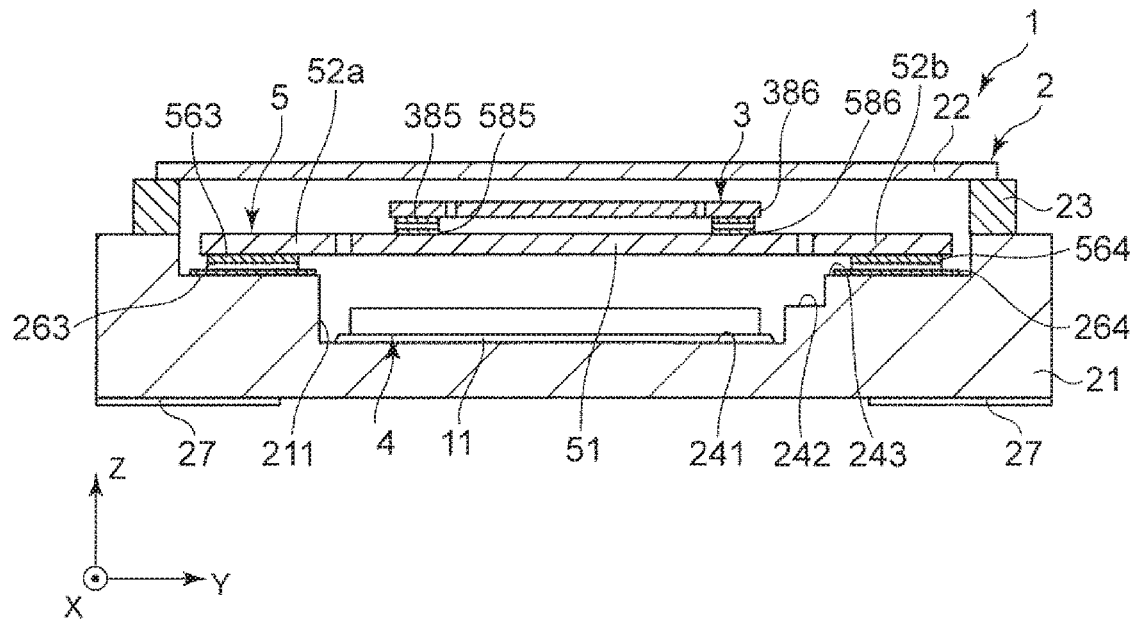
FIG. 2 is a sectional view of the vibration device illustrated in FIG. 1.
Figure 3:
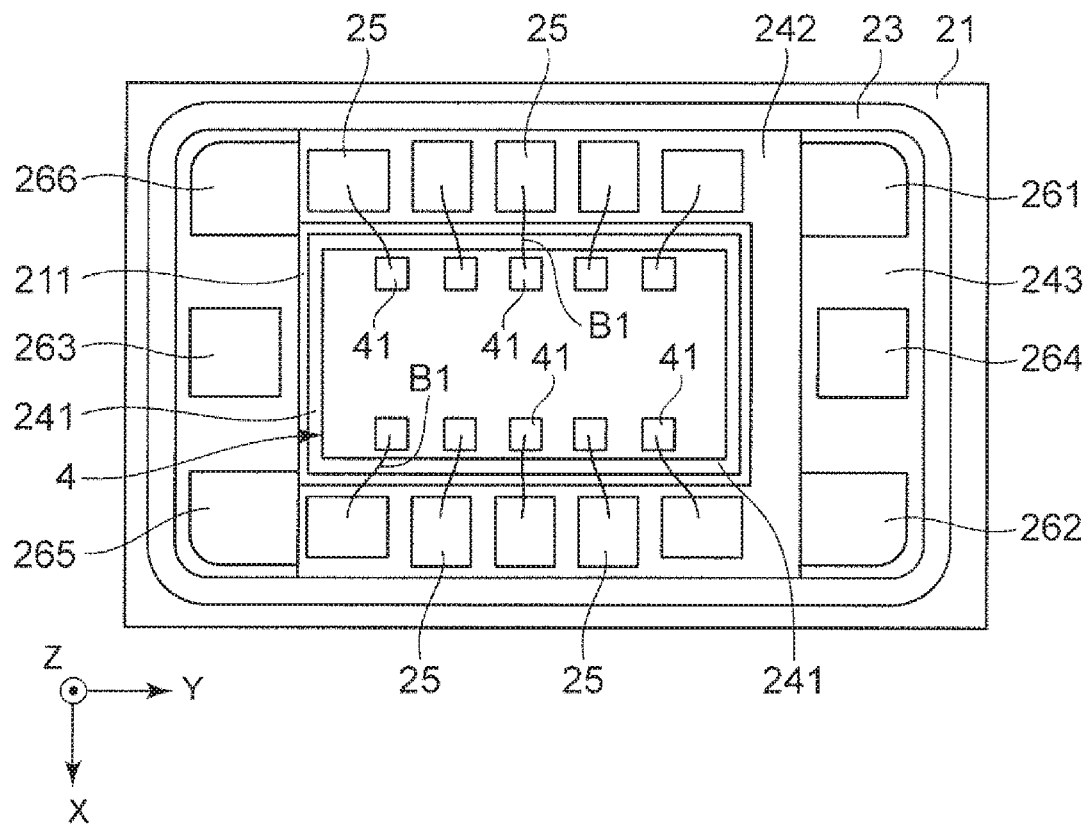
FIG. 3 is a plan view illustrating an IC chip of the vibration device illustrated in FIG. 1.

FIG. 1 is a perspective view of a vibration device according to a first embodiment. FIG. 2 is a sectional view of the vibration device illustrated in FIG. 1. FIG. 3 is a plan view illustrating an IC chip of the vibration device illustrated in FIG. 1. An upper side in FIG. 2 is referred to as "upper", and a lower side in FIG. 2 is referred to as "lower". For convenience of description, FIGS. 1 to 3 illustrate an X-axis, a Y-axis, and a Z-axis as three axes orthogonal to each other, and a tip end side of an arrow indicating each axis is set to "+", and a proximal end side is set to "−". A direction parallel to the X-axis is referred to as a "direction of the X-axis", a direction parallel to the Y-axis is referred to as a "direction of the Y-axis", and a direction parallel to the Z-axis is referred to as a "direction of the Z-axis". A side in the direction of the +Z-axis is referred to as "upper", and a side in the direction of the −Z-axis is referred to as "lower". In the present embodiment, the X-axis, the Y-axis, and the Z-axis respectively correspond to an electrical axis, a mechanical axis, and an optical axis which are crystal axes of a crystal. In FIG. 1, a lid 22 is omitted in the illustration.

The vibration device 1 illustrated in FIGS. 1 and 2 is an angular velocity sensor which detects angular velocity around the Z-axis. This vibration device 1 includes a package 2, a vibration element 3 accommodated inside the package 2, an IC chip 4 (electronic component) disposed inside the package 2, and a board 5 which supports the vibration element 3 with respect to the package 2.

Package

The package 2 has a box shaped base member 21 having a recess to accommodate the vibration element 3 and a plate-shaped lid 22 joined to the base member 21 via a joining member 23 so to close an opening of a recess 211 of the base member 21. A space inside the package 2 may be in a reduced pressure (vacuum) state, or may be hermetically filled with inert gas such as nitrogen, helium, and argon.

The recess 211 of the base member 21 has a lower stage surface 241 located on a bottom side, an upper stage surface 243 located on the opening side, and a middle stage surface 242 located between these surfaces. A configuration material of the base member 21 is not particularly limited, and various ceramics such as aluminum oxide and various glass materials can be used, for example. A configuration material of the lid 22 is not particularly limited. However, for example, it is preferably to use a member having a linear expansion coefficient similar to that of the configuration material of the base member 21. For example, in a case where the configuration material of the base member 21 is the ceramic, as the configuration material of the lid 22, it is preferable to use an alloy such as Kovar. The joining member 23 is configured to employ a seam ring, low melting point glass, and an adhesive.

As illustrated in FIG. 3, the upper stage surface 243 has a plurality of terminals 261, 262, 263, 264, 265, and 266 (electrical connection terminals) electrically connected to the board 5. The middle stage surface 242 has a plurality of terminals 25 electrically connected to the IC chip 4. As illustrated in FIG. 2, a plurality of external connection terminals 27 are formed on a rear surface of the base member 21. The plurality of terminals 261, 262, 263, 264, 265, and 266, the plurality of terminals 25, and the plurality of external connection terminals 27 are connected to each other so as to form circuit wiring by using an internal wire or a through-hole (not illustrated) formed in the base member 21. These connection terminals are not particularly limited as long as the terminals are conductive. For example, the terminals are configured to include metal coating in which each coating of Ni (nickel), Au (gold), Ag (silver), and Cu (copper) is stacked on a metallization layer (ground layer) made of Cr (chromium) and W (tungsten).

In the present embodiment, an outer shape of the base member 21 in a plan view and a shape of the recess 211 in a plan view are respectively rectangular. However, without being limited to the illustrated shapes, any desired shape may be employed. The lid 22 has a flat plate shape having a quadrangular shape in a plan view. However, without being limited to the illustrated shape, the shape of the lid 22 may be any desired shape.

IC Chip (Electronic Component)

As illustrated in FIG. 2, the IC chip 4 is fixed to the lower stage surface 241 of the base member 21 by using an adhesive 11. As illustrated in FIG. 3, the IC chip 4 has a plurality of terminals 41, and each of the terminals 41 is electrically connected to each of the above-described terminals 25 by using a conductive wire B1. The IC chip 4 has a drive circuit for driving and vibrating the vibration element 3 and a detection circuit for detecting detection vibrations generated in the vibration element 3 when angular velocity ω is applied thereto.

Vibration Element

Figure 4:
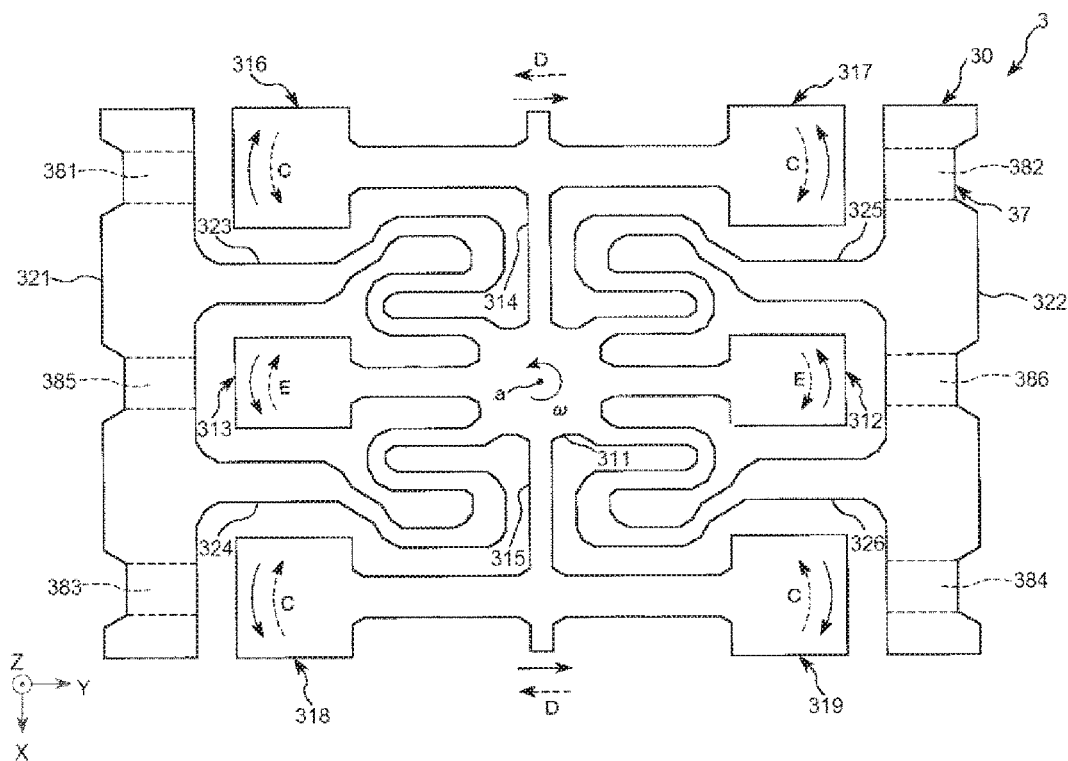
FIG. 4 is a plan view illustrating a vibration element.

FIG. 4 is a plan view illustrating the vibration element.

The vibration element 3 (vibrator element) illustrated in FIG. 4 is a sensor element for detecting the angular velocity ω around the Z-axis. The vibration element 3 has a vibration body 30 and an electrode unit 37 formed on a surface of the vibration body 30.

Vibration Body

The vibration body 30 has a spread in an XY-plane defined by the Y-axis (mechanical axis) and the X-axis (electrical axis) which are crystal axes of a crystal board, and has a plate shape which is thick in the direction of the Z-axis (optical axis). That is, the vibration body 30 is configured to include a Z-cut crystal plate. The Z-axis does not necessarily need to coincide with a thickness direction of the vibration body 30. The Z-axis may be slightly tilted with respect to the thickness direction, from a viewpoint of minimizing a change caused by frequency temperature close to ordinary temperature. Specifically, the Z-cut quartz crystal plate includes a quartz crystal plate having a cut angle so that a plane obtained by rotating a plane orthogonal to the Z-axis in a range of 0° to 10° around at least one of the X-axis and the Y-axis is set to serve as a main surface. A material of the vibration body 30 is not limited to quartz crystal. For example, in addition to the quartz crystal, it is possible to use a piezoelectric material such as lithium tantalate and lithium niobate. The vibration body 30 may employ a material having no piezoelectricity such as silicon. In this case, a piezoelectric element may be appropriately disposed on the vibration body 30.

The vibration body 30 has a base portion 311, a pair of detection vibration arms 312 and 313 extending from the base portion 311 to both sides in the direction of the Y-axis, a pair of coupling arms 314 and 315 extending from the base portion 311 to both sides in the direction of the X-axis, and, a pair of drive vibration arms 316 and 317 extending from a tip end portion of the coupling arms 314 to both sides in the direction of the Y-axis, and a pair of drive vibration arms 318 and 319 extending from the tip end portion of the coupling arms 315 to both sides in the direction of the Y-axis. In addition, the vibration body 30 has a pair of support portions 321 and 322 supporting the base portion 31, a pair of beam portions 323 and 324 for coupling the support portion 321 and the base portion 311 to each other, and a pair of beam portions 325 and 326 for coupling the support portion 322 and the base portion 311 to each other.

In the illustration, each width of the tip end portion (length in the direction of the X-axis) of the detection vibration arms 312 and 313, and the drive vibration arm 316, 317, 318, and 319 is wider than that of the base portion 311. However, the configuration is not limited thereto. For example, the width of the tip end portion of the detection vibration arm 312 and 313, and the drive vibration arms 316, 317, 318, and 319 may be constant. The detection vibration arms 312 and 313, and the drive vibration arms 316, 317, 318, and 319 may respectively have a pair of bottomed grooves which are open to the upper surface and the lower surface and extend in the direction of the Y-axis.

Electrode Unit

The electrode unit 37 has an electrode pattern (not illustrated) and a plurality of terminals 381, 382, 383, 384, 385, and 386, which are disposed on a surface of the vibration body 30.

Although not illustrated, the electrode pattern has a drive signal electrode and a drive ground electrode which are disposed in the drive vibration arms 316, 317, 318, and 319, and a detection signal electrode and a detection ground electrode which are disposed in the detection vibration arms 312 and 313.

A lower surface of the support portion 321 has a terminal 381 (drive signal terminal) electrically connected to a drive signal electrode (not illustrated), a terminal 383 (detection signal terminal) electrically connected to a detection signal electrode (not illustrated), and a terminal 385 (detection ground terminal) having a reference potential for a detection signal electrode (not illustrated). A lower surface of the support portion 322 has a terminal 382 (drive ground terminal) electrically connected to a drive ground electrode (not illustrated), a terminal 384 (detection signal terminal) electrically connected to a detection signal electrode (not illustrated), and a terminal 386 (detection ground terminal) having a reference potential for a detection signal electrode (not illustrated).

A configuration material of the electrode unit 37 is not particularly limited as long as the material is conductive. For example, the electrode unit 37 can be configured to include metal coating in which each coating of Ni (nickel), Au (gold), Ag (silver), and Cu (copper) is stacked on a metallization layer (ground layer) made of Cr (chromium) and W (tungsten).

In this vibration element 3, a drive signal is input to the terminal 381 (drive signal terminal) in a state where the angular velocity ω is not applied to the vibration element 3. In this manner, if an electric field is generated between the drive signal electrode and the drive ground electrode, the drive vibration arms 316, 317, 318, and 319 performs bending vibration (drive vibration) in a direction indicated by an arrow C in FIG. 4. At this time, the drive vibration arms 316 and 317 and the drive vibration arms 318 and 319 perform vertically symmetrical vibration in FIG. 4. Accordingly, the base portion 311 and the detection vibration arms 312 and 313 are rarely vibrated.

In state of this drive vibration, if the angular velocity w around a central axis a (center of gravity) along the Z-axis is applied to the vibration element 3, detection vibration (vibration in a detection mode) is excited. Specifically, the Coriolis force in a direction indicated by an arrow D in FIG. 4 acts on the drive vibration arms 316, 317, 318, and 319 and the coupling arm 314 and 315, thereby exciting new vibration. Correspondingly, detection vibration in a direction indicated by an arrow E in FIG. 4 is excited in the detection vibration arms 312 and 313 so as to cancel the vibration of the coupling arms 314 and 315. Then, a charge generated in the detection vibration arms 312 and 313 due to this detection vibration is extracted as a detection signal from the detection signal electrode, and the angular velocity ω is obtained, based on this detection signal.

Board

Figure 5:
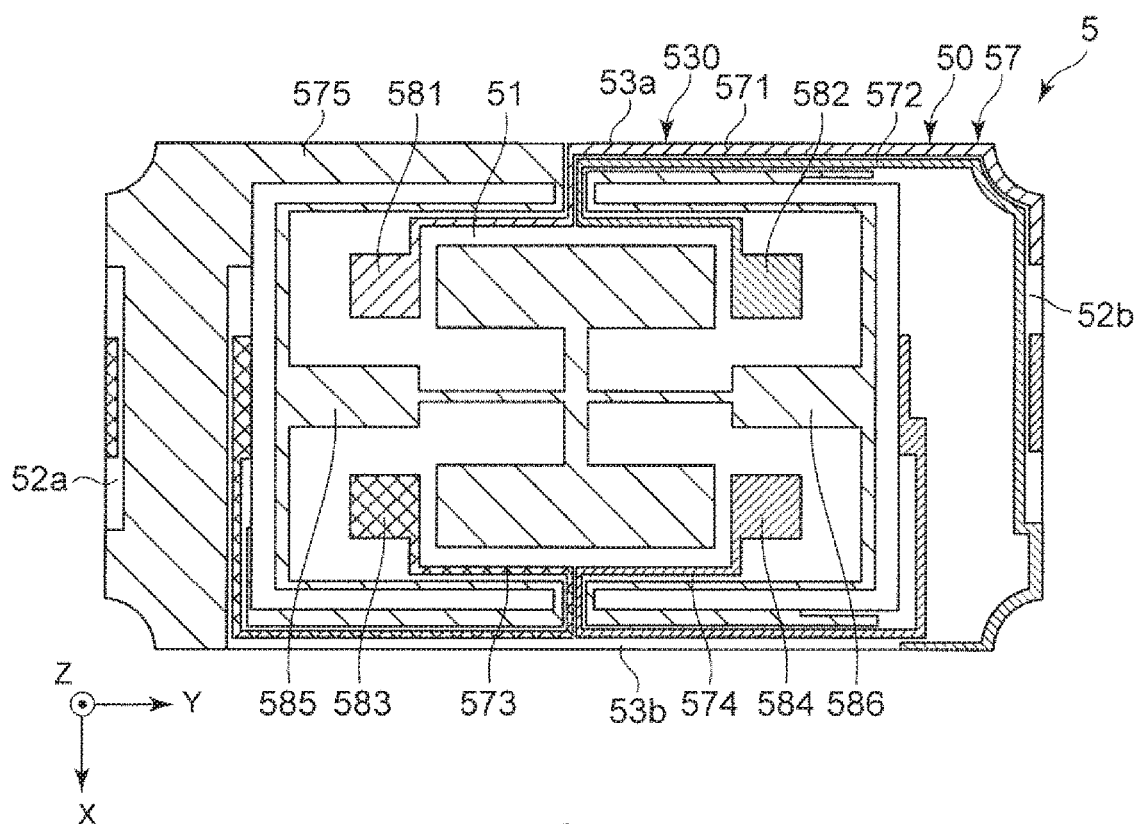
FIG. 5 is a plan view of a board.
Figure 6:
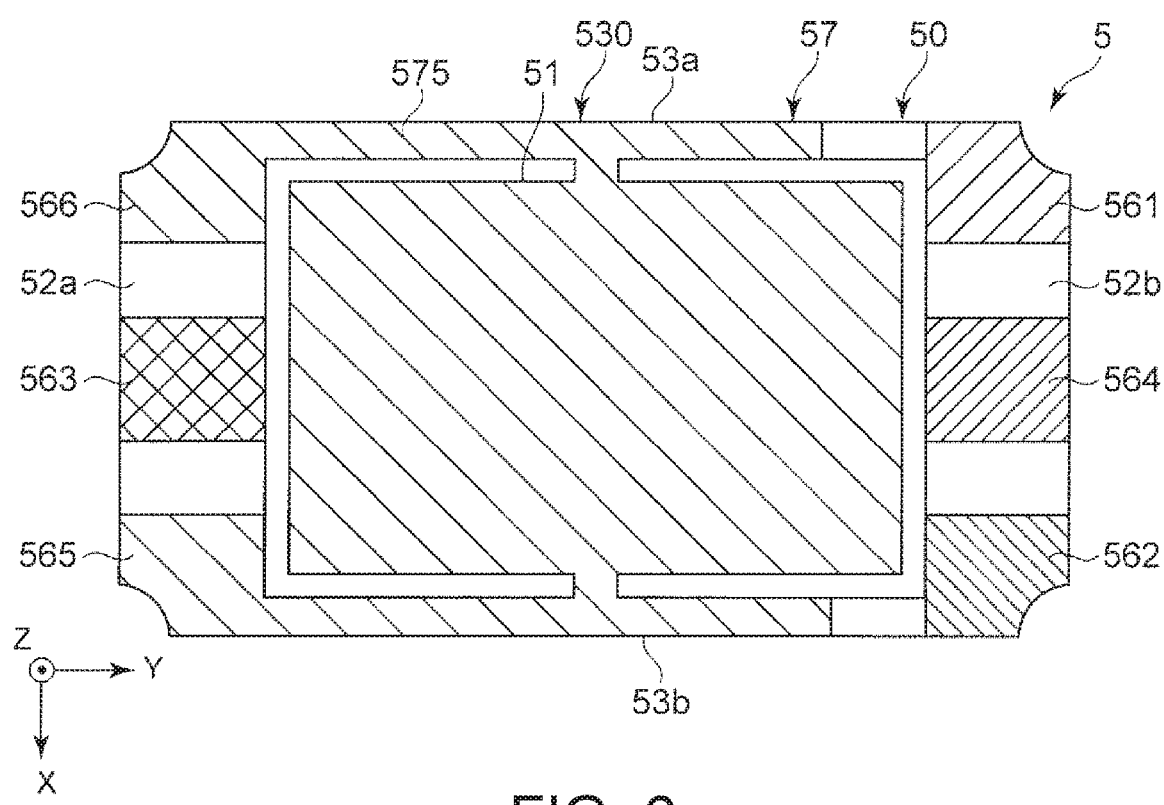
FIG. 6 is a plan view (transparent view) of the board illustrated in FIG. 5.
Figure 7:
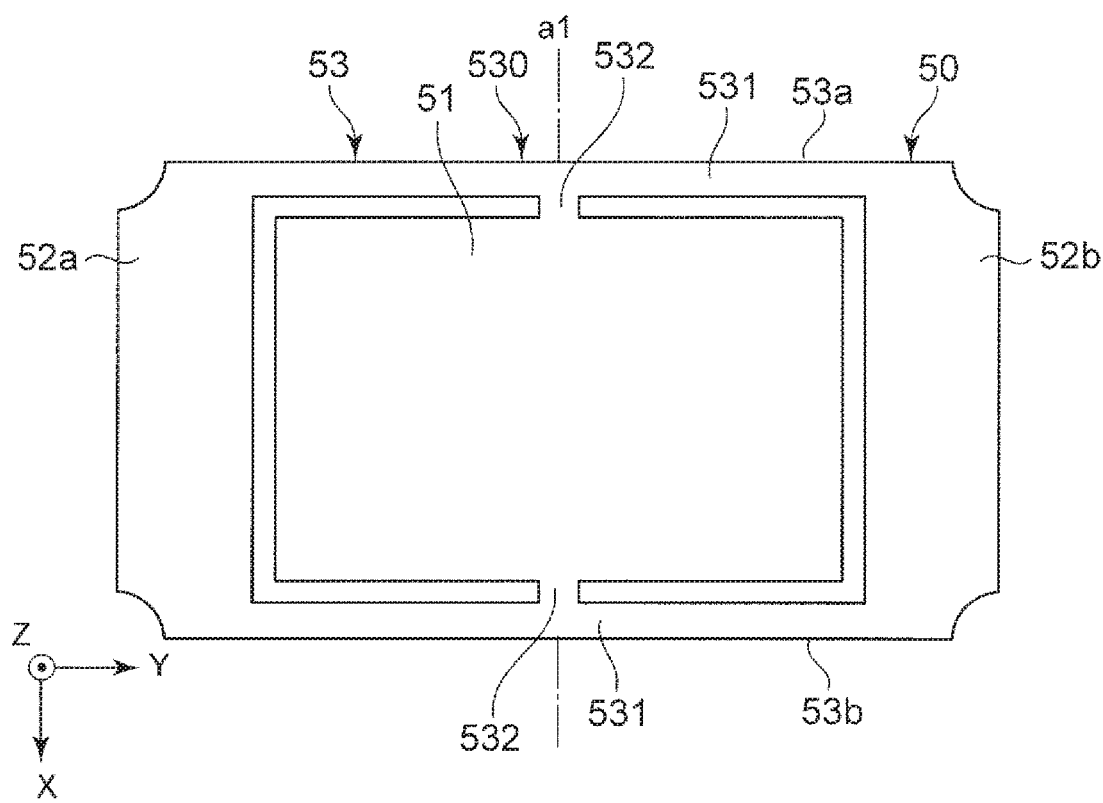
FIG. 7 is a plan view of a main body of the board illustrated in FIG. 5.

FIG. 5 is a plan view of the board. FIG. 6 is a plan view (transparent view) of the board illustrated in FIG. 5. FIG. 7 is a plan view of the main body of the board illustrated in FIG. 5.

As illustrated in FIGS. 5 and 6, the board 5 has a flat plate-shaped main body 50 and a wiring portion 57 formed on the surface of the main body 50.

Main Body

As illustrated in FIG. 7, the main body 50 has a mounting portion 51 (vibration element mounting portion) which is located at a central portion of the board 5 and has a rectangular shape in a plan view, fixing portions 52a and 52b (base fixing portions) which have substantially a rectangular shape in a plan view and which are located on sides mutually opposite to the mounting portion 51 in a plan view, and two elongated beam portions 53a and 53b for coupling the fixing portion 52a and 52b to each other and the fixing portions 52a and 52b and the mounting portion 51 to each other.

The fixing portion 52a is disposed apart from the mounting portion 51, and is located on the left side in FIG. 7 with respect to the mounting portion 51. The fixing portion 52b is disposed apart from the mounting portion 51, and is located on the right side in FIG. 7 with respect to the mounting portion 51.

The beam portions 53a and 53b are located on sides mutually opposite to the mounting portion 51. The beam portion 53a is located on the upper side of the mounting portion 51 in FIG. 7, and the beam portion 53b is located on the lower side of the mounting portion 51 in FIG. 7.

The beam portions 53a and 53b respectively have a first portion 531 extending along the direction of the Y-axis (first direction), and a second portion 532 extending from the middle of the first portion 531 in the direction of the X-axis (second direction) orthogonal to the first portion 531. One end of the first portion 531 is connected to the fixing portion 52a, and the other end of the first portion 531 is connected to the fixing portion 52b. One end of the second portion 532 is connected to the central portion of the first portion 531, and the other end of the second portion 532 is connected to the mounting portion 51. A relationship between the width (length along the direction of the Y-axis) and the length (length in the direction of the Z-axis) of the second portion 532 is not limited to the illustrated example.

In the present embodiment, a line segment a1 connecting the center line of the second portion 532 of the beam portion 53a and the center line of the second portion 532 of the beam portion 53b coincides with the center line extending along a lateral direction of the mounting portion 51.

In this main body 50, in a plan view, a first frame body 530 having an annular shape surrounding the mounting portion 51 is configured to include the fixing portions 52a and 52b, the first portion 531 of the beam portion 53a, and the first portion 531 of the beam portion 53b.

It is preferable that the main body 50 of the board 5 is configured to have an insulating material. That is, the board 5 includes the insulating material. In this manner, it is possible to reduce possibilities that thermal stress may be generated between the base member 21 and the board 5 and between the vibration element 3 and the board 5. Specifically, a configuration material of the main body 50 is not particularly limited. However, for example, it is preferable to use the insulating material such as quartz crystal, silicon, and ceramics. In particular, as the configuration material of the main body 50, it is preferable to use a material the same as the configuration material of the vibration body 30. In this manner, a thermal expansion difference between the vibration element 3 and the board 5 can be reduced, and the thermal stress resulting from the thermal expansion difference therebetween can be reduced. In the present embodiment, the vibration body 30 is configured to include quartz crystal as described above. Therefore, it is preferable to use the quartz crystal as the configuration material of the main body 50.

Wiring Portion

As illustrated in FIG. 5 or 6, the wiring portion 57 has a plurality of terminals 581, 582, 583, 584, 585, and 586 disposed on the upper surface of the mounting portion 51, terminals 561, 562, 563, 564, 565, and 566 disposed on the lower surface of the fixing portion 52a or the fixing portion 52b, and a plurality of wires 571, 572, 573, 574, and 575.

The terminals 581, 582, 583, 584, 585, and 586 illustrated in FIG. 5 are respectively used to be electrically connected to the above-described vibration element 3, and are disposed at positions corresponding to the terminals 381, 382, 383, 384, 385, and 386 of the vibration element 3 (refer to FIGS. 4 and 5). The terminals 581, 583, and 585 are located on the −Y-axis side of the mounting portion 51, and the terminals 582, 584, and 586 are located on the +Y-axis side of the mounting portion 51.

The terminals 561, 562, 563, 564, 565, and 566 illustrated in FIG. 6 are respectively used to be electrically connected to the plurality of terminals 261, 262, 263, 264, 265, and 266 belonging to the above-described base member 21, and are disposed at positions corresponding to the terminals 261, 262, 263, 264, 265, and 266 belonging to the base member 21 (refer to FIGS. 3 and 5). The terminals 561, 562, and 564 are disposed on the lower surface of the fixing portion 52b, and the terminals 563, 565, and 566 are disposed on the lower surface of the fixing portion 52a.

The wire 571 is disposed on the upper surface of the mounting portion 51 and the upper surface of the beam portion 53a, and electrically connects the terminal 581 and the terminal 561 to each other. The wire 572 is disposed on the upper surface of the mounting portion 51, the upper surface of the beam portion 53a, and the upper surface of the fixing portion 52b, and electrically connects the terminal 582 and the terminal 562 to each other. The wire 573 is disposed on the upper surface of the mounting portion 51, the upper surface of the beam portion 53b, and the upper surface of the fixing portion 52a, and electrically connects the terminal 583 and the terminal 563 to each other. The wire 574 is disposed on the upper surface of the mounting portion 51, the upper surface of the beam portion 53b, and the upper surface of the fixing portion 52b, and electrically connects the terminal 585 and the terminal 565 to each other. The wire 575 is disposed on the upper surface and the lower surface of the mounting portion 51, the upper surface and the lower surface of the beam portions 53a and 53b, the upper surface of the fixing portion 52a, and electrically connects the terminals 585 and 586 and the terminals 565 and 566 to each other.

The wire 575 is disposed in the entire area of the lower surface of the mounting portion 51. In the wire 575, a portion disposed on the lower surface of the mounting portion 51 functions as shield wiring for electrically shielding the mounting portion 51 from signal interference caused by parasitic capacitance. This shield wiring is electrically connected to a constant potential which is the ground in the present embodiment. Here, the constant potential means a ground potential or a potential fixed to a constant potential.

The configuration material of the wiring portion 57 is not particularly limited as long as the material is conductive. For example, the wiring portion 57 can be configured to include metal coating in which each coating of Ni (nickel), Au (gold), Ag (silver), and Cu (copper) is stacked on a metallization layer (ground layer) made of Cr (chromium) and W (tungsten).

In the board 5 as described above, the terminals 561, 562, 563, 564, 565, and 566 are respectively bonded and fixed to the corresponding terminals 261, 262, 263, 264, 265, and 266 of the base member 21 via a conductive adhesive, for example (refer to FIGS. 2, 3, and 6). In this manner, the board 5 is fixed to the base member 21 (refer to FIG. 2). As illustrated in FIG. 2, the mounting portion 51 is not in contact with the base member 21, and is located above the recess 211. In the board 5, the above-described terminals 581, 582, 583, 584, 585, and 586 are respectively connected and bonded to the corresponding terminals 381, 382, 383, 384, 385, and 386 of the vibration element 3 via the conductive adhesive (refer to FIGS. 2, 4 and 5). In this manner, as illustrated in FIG. 2, the vibration element 3 is mounted on the mounting portion 51. In this way, the board 5 connects the base member 21 and the vibration element 3 to each other, and electrically connects the terminal 261, 262, 263, 264, 265, and 266 disposed in the base member 21 and the terminals 381, 382, 383, 384, 385, and 386 of vibration element 3 to each other.

As described above, the beam portions 53a and 53b of the board 5 support the mounting portion 51 with respect to the fixing portions 52a and 52b. The beam portions 53a and 53b support the mounting portion 51 with respect to the fixing portions 52a and 52b so that the mounting portion 51 is not shaken due to the angular velocity ω when the angular velocity ω is applied to the vibration element 3 on the mounting portion 51. Therefore, for example, it is preferable that resonance frequencies of the second portion 532 of the beam portion 53a and the second portion 532 of the beam portion 53b are respectively higher than a resonance frequency of the vibration body 30 as high as at least 10 KHz. In this manner, when the angular velocity ω is applied to the vibration element 3, the shaking of the mounting portion 51 shaken due to the angular velocity ω can be prevented or reduced.

As described above, the wiring portion 57 has shield wire electrically connected to a constant potential. Specifically, as described above, the wiring portion 57 is disposed in the entire area of the lower surface of the mounting portion 51, and has a wire 575 electrically connected to the ground. In this manner, it is possible to reduce capacitance between the electrode unit 37 of the vibration element 3 and a wiring layer (not illustrated) having the terminals 261, 262, 263, 264, 265, and 266 formed in the base member 21 or the IC chip 4. Therefore, in the vibration device 1, the S/N ratio is improved, and it is possible to more accurately detect the angular velocity ω. In a case where the IC chip 4 uses a digital output, the frequency band is in the order of MHz. Accordingly, it is a particularly effective way that the wiring portion 57 has the shield wiring.

As described above, the terminals 581, 582, 583, 584, 585, and 586 disposed in the mounting portion 51 are respectively disposed at positions corresponding to the terminals 381, 382, 383, 384, 385, and 386 of the vibration element 3. In this way, a pattern of the wiring portion 57 of the board 5 is set and changed to match the vibration element 3. In this manner, various types of the vibration element 3 can be connected to (mounted on) the same package 2. Therefore, in a case where the holding position or the pattern of the vibration element 3 is changed due to a design change in the mounting portion 51, it is not necessary to change the package 2 in accordance with the design change. Accordingly, it is possible to prevent poor productivity caused by the design change.

The route of the wires 571, 572, 573, 574, and 575, the arrangement of the terminals 581, 582, 583, 584, 585, and 586, and the arrangement of the terminals 561, 562, 563, 564, 565, and 566 are not limited to the illustrated forms.

Hitherto, the configuration of the vibration device 1 has been described.

As described above, the vibration device 1 has the board 5 that has the vibration element 3 having the plurality of terminals 381, 382, 383, 384, 385, and 386, the base member 21 (base) having the plurality of terminals 261, 262, 263, 264, 265, and 266 (electrical connection terminals), and the wiring portion 57 which electrically connects the plurality of terminals 261, 262, 263, 264, 265, and 266 and the plurality of (corresponding) terminals 381, 382, 383, 384, 384, 385, and 386 to each other, and that supports the vibration element 3 with respect to the base member 21. The board 5 has the fixing portions 52a and 52b (base fixing portions) fixed to the base member 21, the mounting portion 51 (vibration element mounting portion) on which the vibration body 30 is mounted, and at least one beam portion (in the present embodiment, two beam portions 53a and 53b) which couples the fixing portions 52a and 52b and the mounting portion 51 to each other. The two beam portions 53a and 53b respectively have the first portion 531 extending in the direction of the Y-axis (first direction) and the second portion 532 extending in the direction of the X-axis (second direction) intersecting (orthogonal in the present embodiment) the direction of the Y-axis.

According to the vibration device 1 as described above, there is provided the board 5 including the beam portions 53a and 53b having the first portion 531 and the second portion 532 which intersect each other. Accordingly, it is possible to lengthen a transmission route through which stress generated by deformation of the base member 21 due to an external force (for example, impact) is transmitted to the mounting portion 51. Therefore, the stress can be absorbed or suppressed by the beam portions 53a and 53b. Therefore, since the deformation of the mounting portion 51 which results from the stress can be reduced, a holding state of the vibration element 3 does not greatly vary. Therefore, it is possible to reduce possibilities that the vibration characteristics of the vibration element 3 may vary due to the external force, and it is possible to provide the vibration device 1 which is highly stable and robust to the external environment. Therefore, in the vibration device 1 serving as the angular velocity sensor, a difference does not vary between the drive frequency (resonance frequency of the drive vibration arm 316, 317, 318, and 319) and the detection frequency (resonance frequency of the detection vibration arms 312 and 313). Accordingly, the detuning frequency representing the difference between the drive frequency and the detection frequency is less likely to vary. Therefore, according to the vibration device 1, it is possible to reduce the variations in the 0 point voltage, and it is possible to realize the angular velocity sensor having low noise.

As described above, the board 5 is connected to the base member 21 by using the conductive adhesive (or bump). For example, in a case where temperature is applied for this connection, thermal stress is generated due to a difference in coefficient of linear expansion between the board 5 and the base member 21. However, according to the beam portions 53a and 53b of the board 5, the deformation of the mounting portion 51 which is caused by the thermal stress can be absorbed or suppressed. For example, according to the board 5, the mounting portion 51 is not deformed even in the order of several nm. Therefore, even if not only the external force such as impact but also the temperature is applied, the deformation of the mounting portion 51 can be reduced. Accordingly a holding state of the vibration element 3 does not vary greatly. Therefore, according to the vibration device 1, it is possible to realize the angular velocity sensor having excellent temperature characteristics.

As described above, the board 5 has two beam portions 53a and 53b. In a plan view, in the board 5, the first frame body 530 surrounding the mounting portion 51 (vibration element mounting portion) is configured to include the fixing portions 52a and 52b, the first portion 531 of the beam portions 53a, and the first portion 531 of the beam portion 53b. In this manner, it is possible to lengthen the transmission route of the stress generated due to the deformation of the base member 21 deformed by the external force. Accordingly, even if the base member 21 is deformed due to the external force, the deformation (distortion) can be more effectively absorbed or suppressed by the first frame body 530. Therefore, the deformation of the mounting portion 51 can be more effectively reduced. Therefore, it is possible to further reduce the variations in the vibration characteristics of the vibration element 3 mounted on the mounting portion 51.

As described above, the board 5 has the opening portion between the first frame body 530 and the mounting portion 51. The first frame body 530 and the mounting portion 51 are coupled to each other in the second portion 532 of the beam portion 53a and the second portion 532 of the beam portion 53b. As described above, in the present embodiment, the line segment a1 connecting the center line of the second portion 532 of the beam portion 53b coincides with the center line extending along the lateral direction of the mounting portion 51. In this manner, it is possible to particularly suppress the deformation of the mounting portion 51 in the longitudinal direction. It is possible to increase the area of the mounting portion 51 on which the vibration element 3 is mounted.

In the present embodiment, the line segment a1 coincides with the center line extending along the lateral direction of the mounting portion 51. However, for example, the line segment a1 may coincide with the centerline extending along the longitudinal direction of the mounting portion 51. In this case, it is possible to particularly suppress the deformation of the mounting portion 51 in the lateral direction.

Stress Relaxation Effect Obtained by Board

Figure 8:
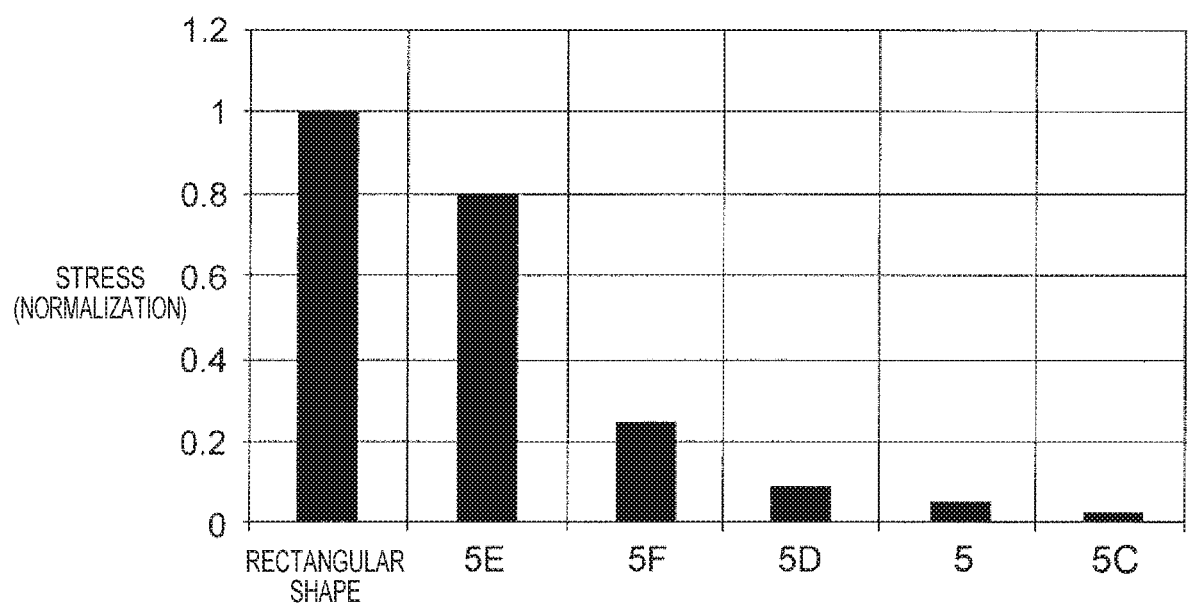
FIG. 8 is a graph illustrating stress in a mounting portion for each shape of the board.

FIG. 8 is a graph illustrating the stress in the mounting portion for each shape of the board.

The "rectangular shape" illustrated on the horizontal axis in FIG. 8 indicates a flat plate-shaped board (hereinafter, referred to as a "board X") which has a rectangular shape in a plan view, which has no hole or groove formed therein, and whose thickness is uniform. The reference numeral "5" indicates the board 5 in the present embodiment. The reference numeral "5C" indicates a board 5C in a fourth embodiment (to be described later), the reference numeral "5D" indicates a board 5D in a fifth embodiment (to be described later), the reference numeral "5E" indicates a board 5E in a first reference example (to be described later), and the reference numeral "5F" indicates a board 5F in a second reference example (to be described later).

FIG. 8 illustrates the stresses generated in a mounting region of the vibration element 3 when the angular velocity) around the central axis a (detection axis) is applied. The stress illustrated in FIG. 8 represents a value obtained by normalizing the board X (rectangular shape) as 1.

As illustrated in FIG. 8, compared to the board X, the stress generated in the mounting region (mounting portion 51) of the vibration element 3 is decreased in the board 5. Specifically, the stress is decreased as much as 90% or more.

In this way, in the vibration device 1, a "base" to which the board 5 is connected is the package 2 including a base member 21. According to the vibration device 1 including the board 5, even if the base member 21 is deformed by the external force, the deformation (distortion) can be absorbed or suppressed by the beam portions 53a and 53b. Accordingly, the mounting portion 51 is not deformed, or is less deformed. Therefore, it is possible to prevent the variations in the characteristics of the vibration element 3 mounted on the mounting portion 51.

Hitherto, as an example, a case where the vibration device 1 according to the invention is used as the angular velocity sensor has been described above. That is, the angular velocity sensor includes the vibration device 1. According to this angular velocity sensor, there is provided the vibration device 1 in which the variations in the vibration characteristics are reduced. Therefore, excellent reliability can be achieved.

Second Embodiment

Next, a second embodiment will be described.

Figure 9:
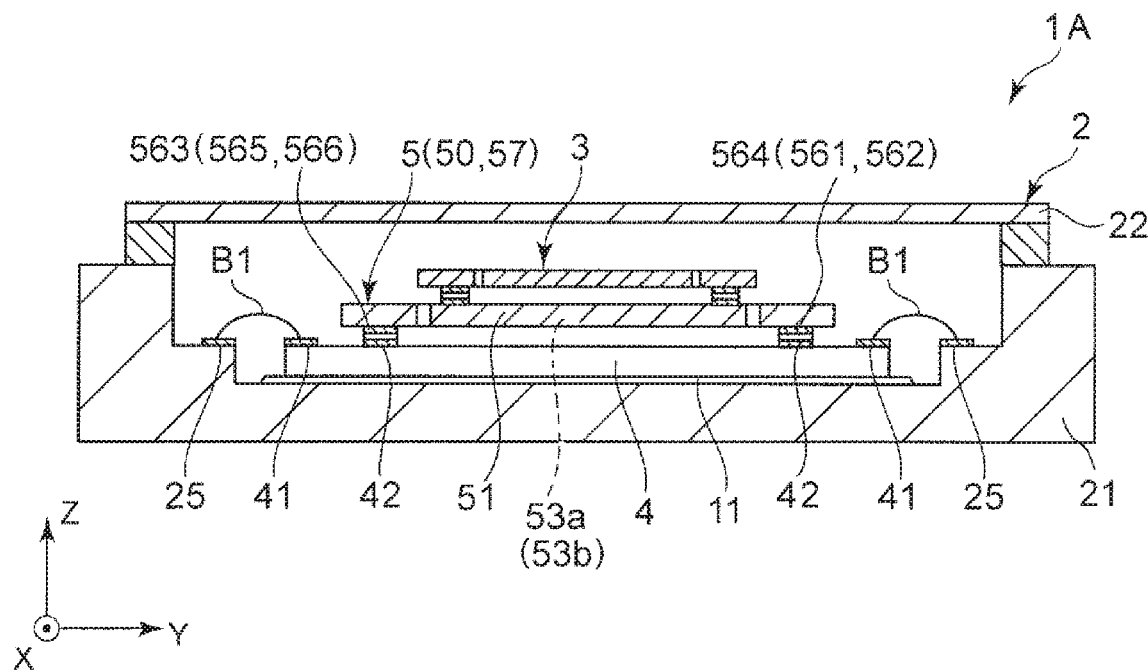
FIG. 9 is a sectional view illustrating a vibration device according to a second embodiment.

FIG. 9 is a sectional view illustrating a vibration device according to the second embodiment.

The present embodiment is basically the same as the above-described embodiment except that the board is disposed on the IC chip. In the following description, the second embodiment will be described mainly focusing on points different from those of the above-described embodiment, and similar items will be omitted in description.

In a vibration device 1A illustrated in FIG. 9, the board 5 is mounted on the IC chip 4 (electronic component) via a conductive adhesive, for example.

The IC chip 4 has a plurality of terminals 42 electrically connected to a plurality of terminals 561, 562, 563, 564, 565, and 566 of the board 5. The plurality of terminals 42 are disposed at positions corresponding to the plurality of terminals 561, 562, 563, 564, 565, and 566 of the board 5.

In this way, in the vibration device 1A, a "base" to which the board 5 is connected is the IC chip 4 (electronic component) including a circuit for driving the vibration element 3. According to this configuration, even if the base member 21 or the IC chip 4 is deformed by the external force, the deformation (distortion) can also be absorbed or suppressed by the beam portions 53a and 53b. Accordingly, the mounting portion 51 is not deformed, or is less deformed. Therefore, it is possible to reduce the variations in the vibration characteristics of the vibration element 3 mounted on the mounting portion 51. In addition, the IC chip 4 and the board 5 can be electrically connected to each other without using wire bonding, for example. The board 5 and the vibration element 3 are disposed immediately above the IC chip 4. Therefore, it is possible to lower the height of the vibration device 1A.

As described in the first embodiment, the wire 575 disposed on the rear surface of the main body 50 in the wiring portion 57 of the board 5 functions as shield wiring (refer to FIG. 6). Therefore, as in the present embodiment, in a case where the vibration element 3 is mounted on the IC chip 4 via the board 5, the shield wiring (wire 575) can reduce capacitance between the IC chip 4 and the vibration element 3. Therefore, it is possible to particularly effectively prevent signal interference via parasitic capacitance from the IC chip 4 with respect to the vibration element 3.

According to the second embodiment as described above, it is also possible to reduce the variations in the vibration characteristics.

Third Embodiment

Next, a third embodiment will be described.

Figure 10:
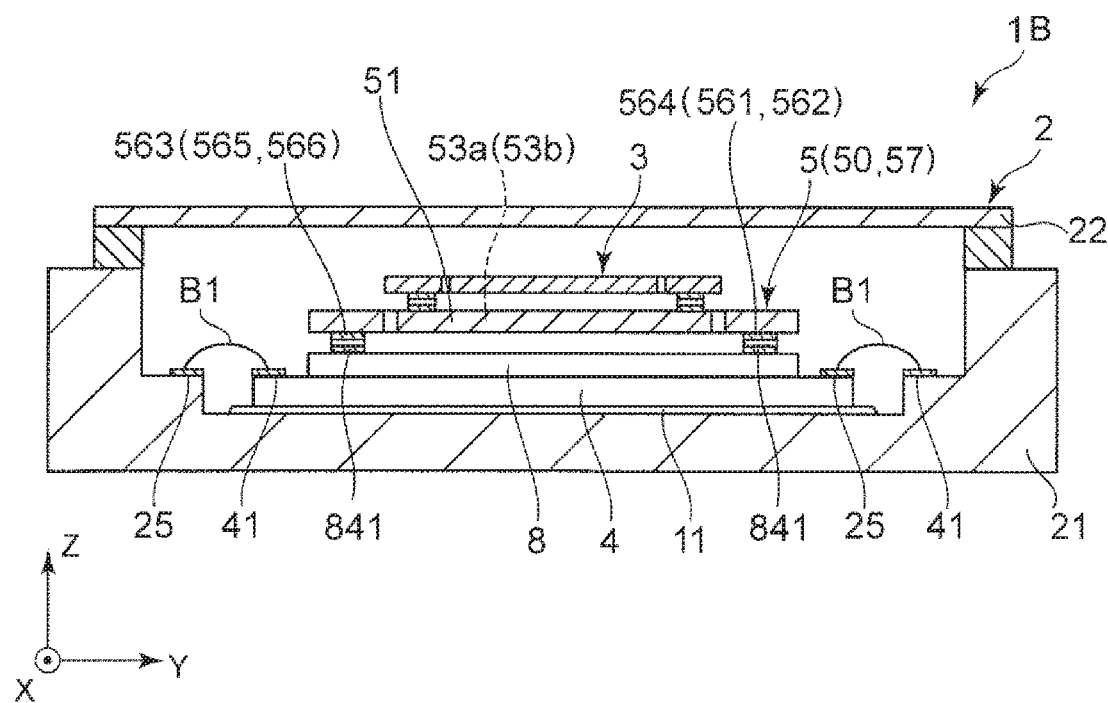
FIG. 10 is a sectional view illustrating a vibration device according to a third embodiment.
Figure 11:
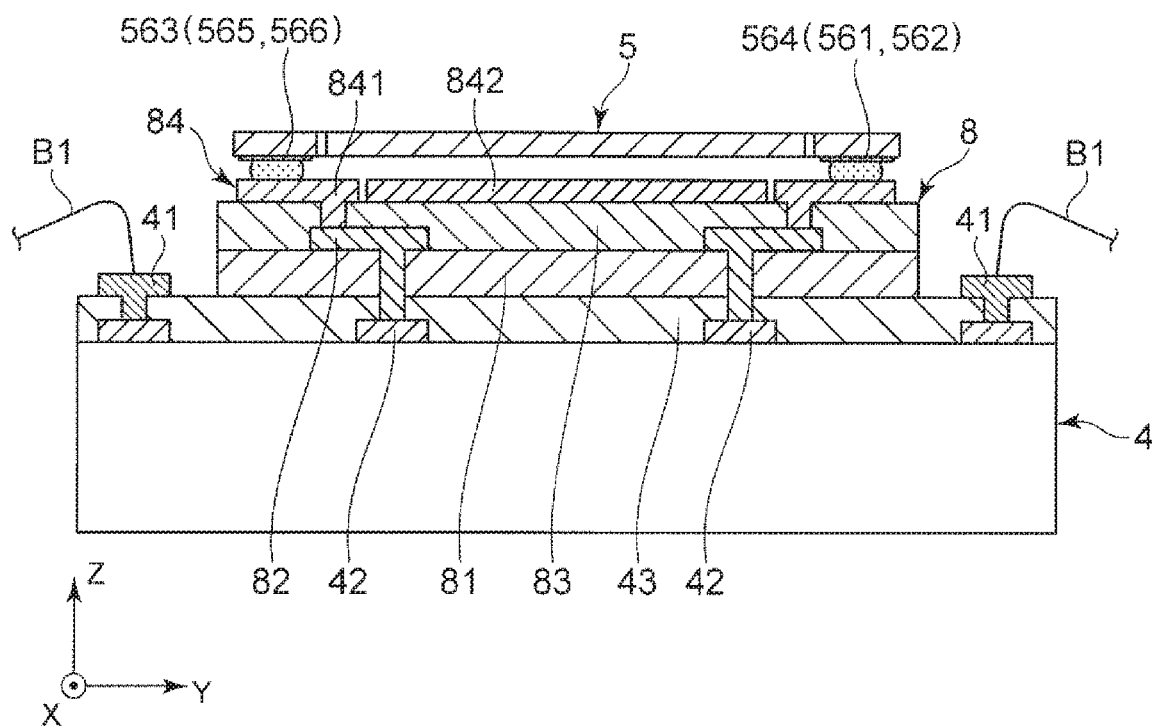
FIG. 11 is a sectional view illustrating a stress relaxation layer.

FIG. 10 is a sectional view illustrating a vibration device according to the third embodiment. FIG. 11 is a sectional view illustrating a stress relaxation layer.

The present embodiment is basically the same as the above-described embodiments except that the board is disposed on the stress relaxation layer. In the following description, the third embodiment will be described mainly focusing on points different from those of the above-described embodiments, and similar items will be omitted in description.

A vibration device 1B illustrated in FIG. 10 includes a stress relaxation layer 8 disposed on the IC chip 4 (electronic component). The board 5 is mounted on the stress relaxation layer 8 via a conductive adhesive, for example.

As illustrated in FIG. 11, the stress relaxation layer 8 is located between the IC chip 4 and the board 5, and is disposed on the upper surface of the IC chip 4. Since the stress relaxation layer 8 is disposed thereon, the impact received by the package 2 is relaxed, and the impact is less likely to be transmitted to the board 5. The stress generated due to a thermal expansion difference between the IC chip 4 and the board 5 is relaxed, and the board 5 is less likely to be bent. Accordingly, it is possible to further reduce the variations in the vibration characteristics of the vibration element 3. As a result, it is possible to accurately detect the angular velocity ω.

Here, as illustrated in FIG. 11, the IC chip 4 includes a passivation film 43 in a lowermost layer thereof. Although not illustrated, the passivation film 43 is disposed on the wiring layer formed on an active surface of the IC chip 4, and protects the wiring layer. The stress relaxation layer 8 is disposed on the upper surface (specifically, on the passivation film 43) of the IC chip 4.

The stress relaxation layer 8 has a stacked first insulating layer 81, a first wiring layer 82 disposed on the first insulating layer 81, a second insulating layer 83 disposed on the first insulating layer 81 and the first wiring layer 82, and the second wiring layer 84 disposed on the second insulating layer 83. The first and second insulating layers 81 and 83 are respectively elastic. Therefore, it is possible to relax the impact as described above. A configuration material of the first and second insulating layers 81 and 83 is not particularly limited. However, for example, it is possible to use resin materials such as polyimide, silicone-modified polyimide resin, epoxy resin, silicone-modified epoxy resin, acrylic resin, phenol resin, silicone resin, modified polyimide resin, benzocyclobutene, and polybenzoxazole. In this manner, it is possible to form the first and second insulating layers 81 and 83 which are sufficiently elastic, and the above-described advantageous effect can be more reliably achieved.

The second wiring layer 84 has a plurality of terminals 841 arranged corresponding to the terminals 561, 562, 563, 564, 565, and 566 of the board 5. The corresponding terminals 561, 562, 563, 564, 565, and 566 of the board 5 are bonded and fixed to the respective terminals 841 via a conductive adhesive, for example. The first wiring layer 82 electrically connects the plurality of terminals 841 of the second wiring layer 84 to the plurality of terminals 42 of the IC chip 4 to each other. In this manner, the board 5 and the IC chip 4 are electrically connected to each other via the stress relaxation layer 8. In this way, the first and second wiring layers 82 and 84 of the stress relaxation layer 8 function as wires (re-arranging wires) for electrically connecting the board 5 and the IC chip 4 to each other. In this manner, for example, the terminals 42 of the IC chip 4 can be freely arranged without considering each position of the terminals 561, 562, 563, 564, 565, and 566 of the board 5. Therefore, the vibration device 1B is more freely designed.

In addition to the terminal 841, the second wiring layer 84 has a shield wiring 842. The shield wiring 842 is widely disposed on the second insulating layer 83 within a range not to interfere with the arrangement of the terminals 841. The shield wiring 842 is electrically connected to the ground, for example. This shield wiring 842 functions as a shielding layer which reduces the capacitance between the electrode unit 37 and the IC chip 4 of the vibration element 3. Therefore, since the shield wiring 842 is disposed thereon, the S/N ratio is improved, and the vibration device 1B can more accurately detect the angular velocity ω. Even in a case where the noise has temperature characteristics, this noise situation can be reduced. Therefore, the vibration device 1B is excellent in the temperature characteristics.

As described above, in the present embodiment, the "base" to which the board 5 is connected is the IC chip 4 and the stress relaxation layer 8. That is, the "base" includes the stress relaxation layer 8 (stress relaxation portion 8) having the IC chip 4 (electronic component) including the circuit for driving the vibration element 3, and the wiring layer (in the present embodiment, the first wiring layer 82 and the second wiring layer 84) disposed between the IC chip 4 and the board 5, and electrically connecting the IC chip 4 and the wiring portion 57 of the board 5 to each other. In this manner, the external force received by the IC chip 4 can be absorbed by the stress relaxation layer 8, and it is possible to further reduce possibilities that the external force may be transmitted to the vibration element 3.

According to the third embodiment as described above, it is also possible to reduce the variations in the vibration characteristics.

Fourth Embodiment

Next, a fourth embodiment will be described.

Figure 12:
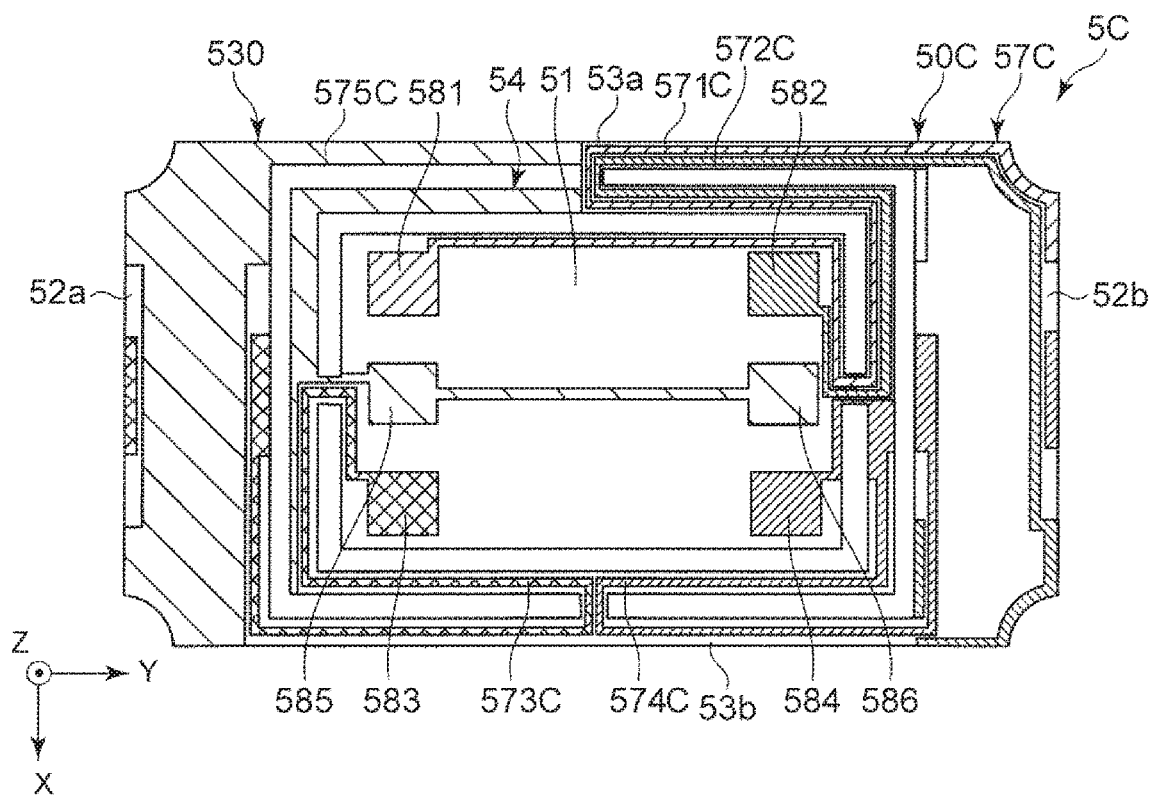
FIG. 12 is a plan view of a board belonging to a vibration device according to a fourth embodiment.
Figure 13:
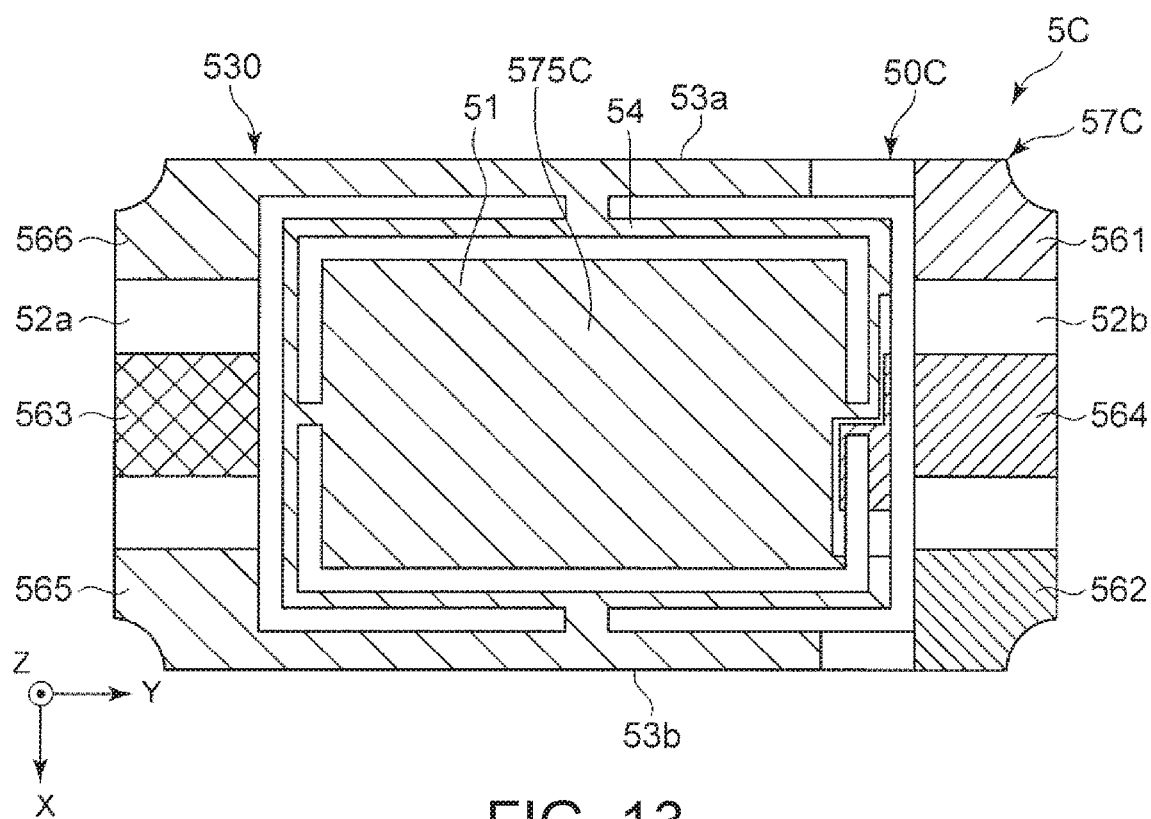
FIG. 13 is a plan view (transparent view) of the board illustrated in FIG. 12.
Figure 14:
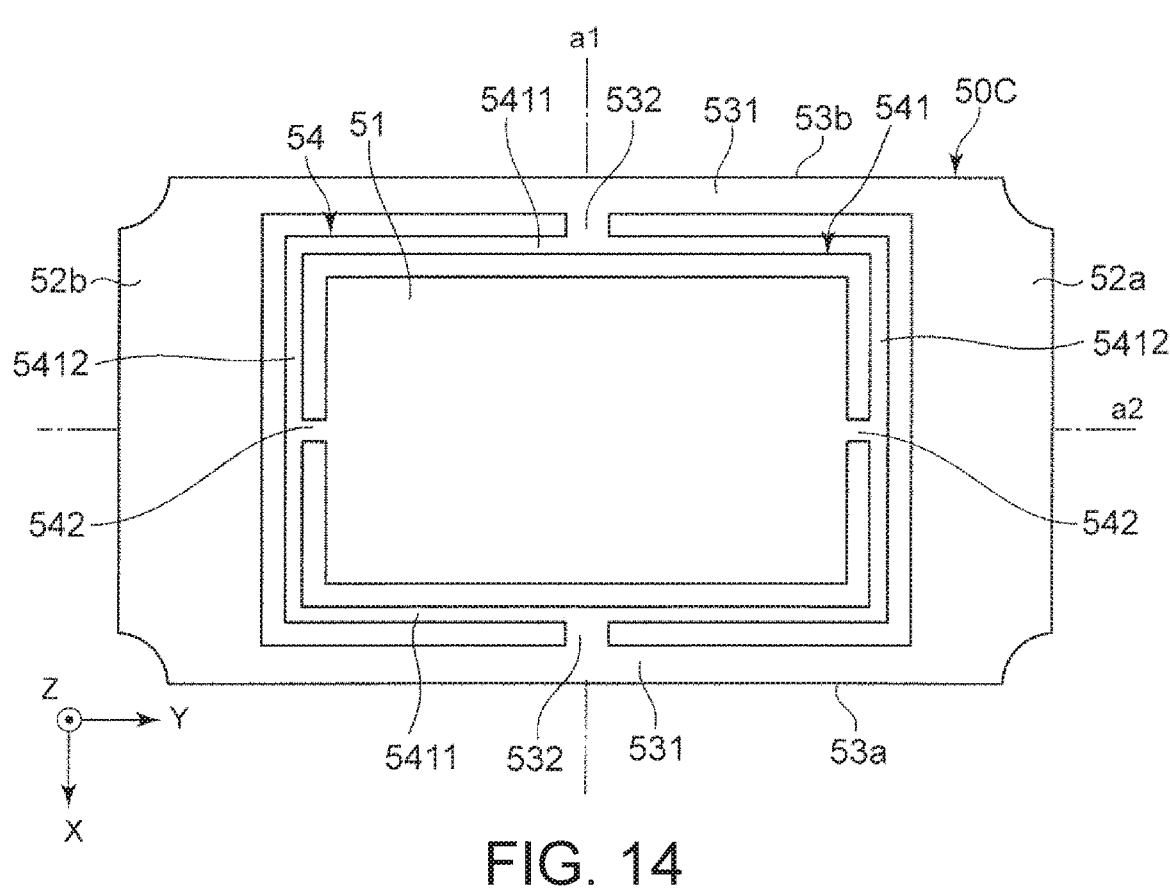
FIG. 14 is a plan view of a main body of the board illustrated in FIG. 13.

FIG. 12 is a plan view of a board belonging to a vibration device according to the fourth embodiment. FIG. 13 is a plan view (transparent view) of the board illustrated in FIG. 12. FIG. 14 is a plan view of a main body of the board illustrated in FIG. 13.

The present embodiment is basically the same as the above-described embodiments except that the board has a different configuration. In the following description, the fourth embodiment will be described mainly focusing on points different from those of the above-described embodiments, and similar items will be omitted in description.

Board

As illustrated in FIGS. 12 and 13, a board 5C has a main body 50C and a wiring portion 57C.

Main Body

As illustrated in FIG. 14, that is, the main body 50C has a first frame body 530 having an annular shape in a plan view, and a second frame body 54 located inside the first frame body 530 and having an annular shape surrounding the mounting portion 51.

The second frame body 54 (beam portion) is located between the first frame body 530 and the mounting portion 51 in a plan view, and is disposed apart from the first frame body 530 and the mounting portion 51.

The second frame body 54 has a frame body portion 541 having a rectangular frame shape, a portion 542 (fifth portion) which couples the frame body portion 541 and the mounting portion 51 to each other. The frame body portion 541 has two portions 5411 (third portion) extending along the direction of the Y-axis, and two portions 5412 (fourth portion) which are connected to both ends of the portion 5411 and extend along the direction of the X-axis. The portion 5411 is connected to the second portion 532 of the beam portions 53a and 53b, and the portion 5412 is connected to the portion 542 (fifth portion).

The two portions 542 (fifth portion) are located on sides mutually opposite to the mounting portion 51, and a line segment a2 connecting the center lines of the two portions 542 coincides with the center line extending along the longitudinal direction of the mounting portion 51. The line segment a1 and the line segment a2 intersect each other, and are orthogonal to each other in the present embodiment.

Wiring Portion

As illustrated in FIG. 12 or 13, a wire 571C is disposed on the upper surface of the mounting portion 51 and the upper surface of the beam portion 53a. A wire 572 C is disposed on the upper surface of the mounting portion 51, the upper surface of the beam portion 53a, and the upper surface of the fixing portion 52b. A wire 573C is disposed on the upper surface of the mounting portion 51, the upper surface of the beam portion 53b, and the upper surface of the fixing portion 52a. A wire 574C is disposed on the upper surface of the mounting portion 51, the upper surface of the beam portion 53b, and the upper surface of the fixing portion 52b. A wire 575C is disposed on the upper surface of the mounting portion 51, the upper surface and the lower surface of the beam portions 53a and 53b, and the upper surface of the fixing portion 52a. The wire 575C is disposed in the entire area of the lower surface of the mounting portion 51.

The second frame body 54 of the board 5C supports the mounting portion 51 together with the beam portions 53a and 53b with respect to the fixing portions 52a and 52b so that the mounting portion 51 is not shaken when the angular velocity ω is applied to the vibration element 3. For example, it is preferable that the resonance frequency of the second frame body 54 is higher than the resonance frequency of the vibration body 30 as high as at least 10 KHz. In this manner, when the angular velocity ω is applied to the vibration element 3, the shaking of the mounting portion 51 shaken due to the angular velocity ω can be prevented or reduced.

As described above, the board 5C according to the present embodiment has the second frame body 54 located between the first frame body 530 and the mounting portion 51 (vibration element mounting portion) in a plan view. In this manner, it is possible to lengthen a transmission route of stress generated by the package 2 deformed due to the external force. Therefore, the stress generated due to the deformation can be absorbed or suppressed by the first frame body 530 and the second frame body 54. As a result, the deformation of the mounting portion 51 can be more effectively reduced. Therefore, it is possible to more effectively reduce the variations in the vibration characteristics of the vibration element 3 mounted on the mounting portion 51.

As described above, the board 5C has the opening portion disposed between the first frame body 530 and the second frame body 54. The first frame body 530 and the second frame body 54 are coupled to each other by the second portion 532 of the beam portion 53a and the second portion 532 of the beam portion 53b. Furthermore, the board 5C has the opening portion disposed between the second frame body 54 and the mounting portion 51. The second frame body 54 and the mounting portion 51 are coupled to each other by the two portions 542 (fifth portion) of the second frame body 54. As described above, in the present embodiment, the line segment a1 coincides with the center line extending along the lateral direction of the mounting portion 51, and the line segment a2 coincides with the center line extending along the longitudinal direction of the mounting portion 51. The line segment a1 and the line segment a2 intersect each other (in the present embodiment, orthogonal to each other). In this manner, the deformation in the longitudinal direction and the deformation in the lateral direction of the board 5 are less likely to be transmitted to the mounting portion 51. Therefore, it is possible to more accurately realize the more stabilized angular velocity sensor.

In the illustration, the line segment a1 coincides with the center line extending along the lateral direction of the mounting portion 51, and the line segment a2 coincides with the center line extending along the longitudinal direction of the mounting portion 51. However, the configuration may be conversely adopted. That is, the line segment a1 may coincide with the center line extending along the longitudinal direction of the mounting portion 51, and the line segment a2 may coincide with the center line extending along the lateral direction of the mounting portion 51. For example, in a plan view, a frame body may be further disposed between the second frame body 54 and the mounting portion 51. That is, the board 5C may have three or more frame bodies surrounding the mounting portion 51 in a plan view. In this manner, it is possible to further lengthen the transmission route of the stress generated by the package 2 deformed due to the external force.

As illustrated in FIG. 8, according to the board 5C, compared to the board X, the stress generated in the mounting region (mounting portion 51) of the vibration element 3 can be decreased. Specifically, the stress can be decreased as much as 90% or more. According to the board 5C, compared to the board 5 in the first embodiment, the stress generated in the mounting portion 51 can be further decreased.

According to the fourth embodiment as described above, it is also possible to reduce the variations in the vibration characteristics.

Fifth Embodiment

Next, a fifth embodiment will be described.

Figure 15:
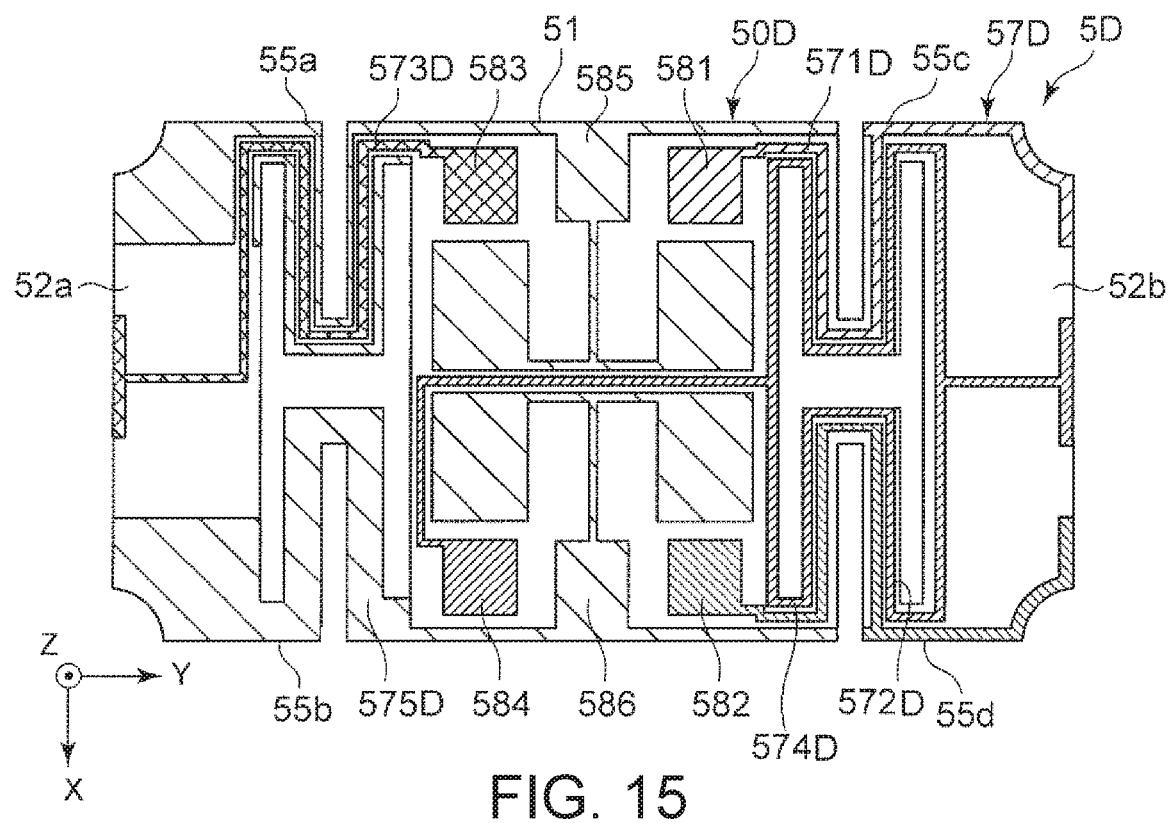
FIG. 15 is a plan view of a board belonging to a vibration device according to a fifth embodiment.
Figure 16:
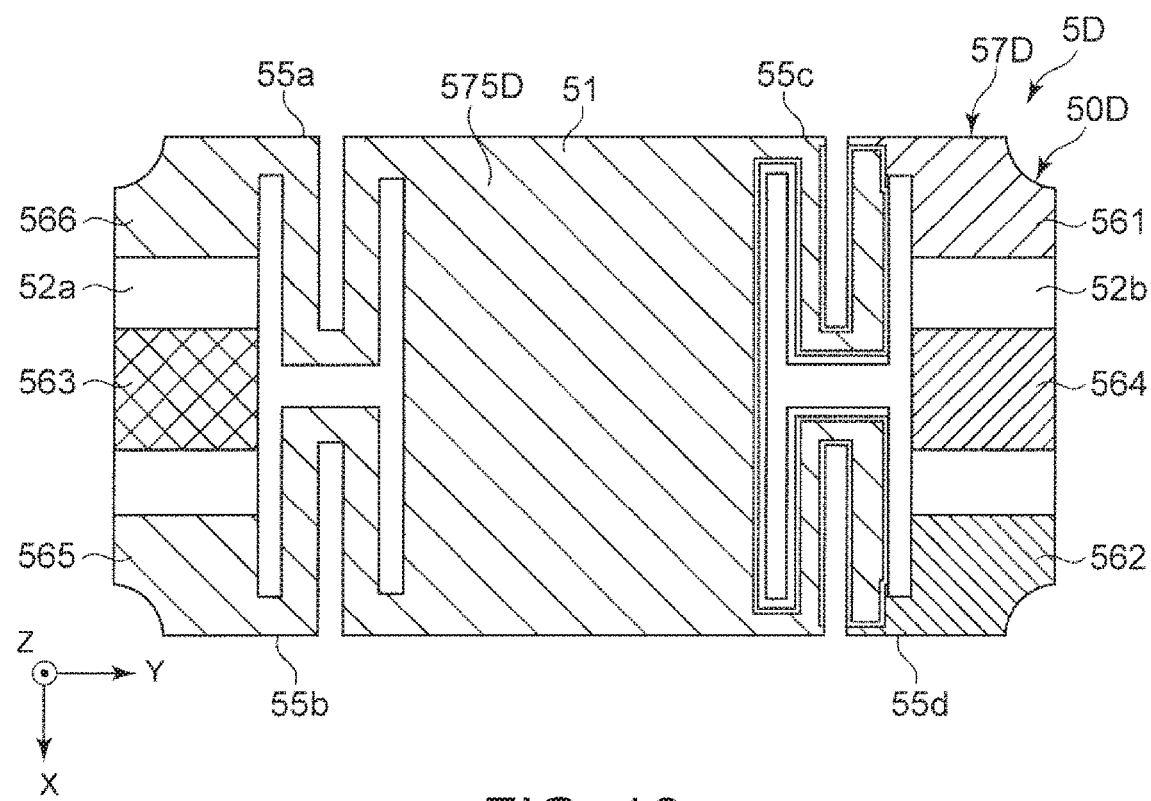
FIG. 16 is a plan view (transparent view) of the board illustrated in FIG. 15.
Figure 17:
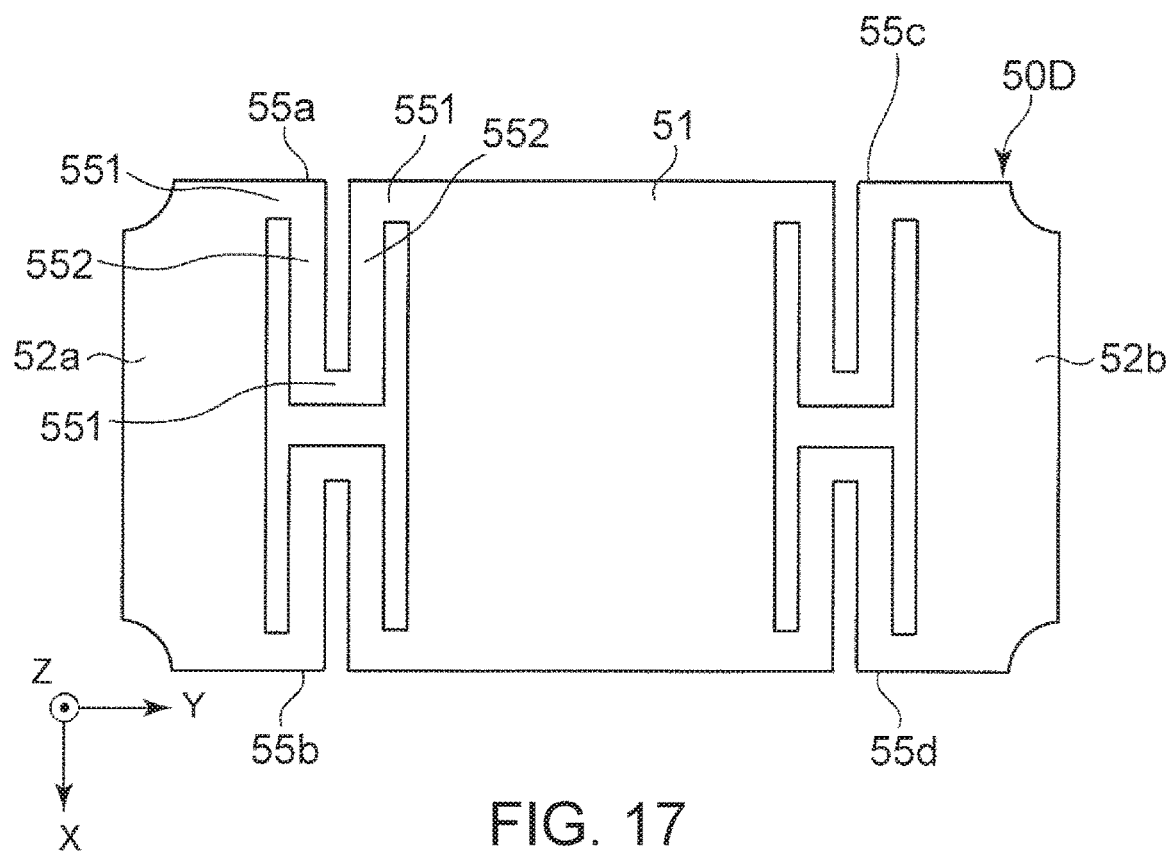
FIG. 17 is a plan view of a main body of the board illustrated in FIG. 15.

FIG. 15 is a plan view of a board belonging to a vibration device according to the fifth embodiment. FIG. 16 is a plan view (transparent view) of the board illustrated in FIG. 15. FIG. 17 is a plan view of a main body of the board illustrated in FIG. 15.

The present embodiment is basically the same as the above-described embodiments except that the board has a different configuration. In the following description, the fifth embodiment will be described mainly focusing on points different from those of the above-described embodiments, and similar items will be omitted in description.

Board

As illustrated in FIGS. 15 and 16, a board 5D has a main body 50D and a wiring portion 57D.

Main Body

As illustrated in FIG. 17, the main body 50D has a plurality of beam portions 55a, 55b, 55c, and 55d having a meandering shape in a plan view.

The beam portions 55a and 55b respectively couple the fixing portion 52a and the mounting portion 51 to each other. The beam portions 55c and 55d respectively couple the fixing portion 52b and the mounting portion 51 to each other.

The beam portions 55a, 55b, 55b, 55c, and 55d respectively have three first portions 551 extending along the direction of the Y-axis, and two second portions 552 which are longer than the first portions 551 along the direction of the X-axis.

In the respective beam portions 55a and 55b, the first portions 551 and the second portions 552 are alternately coupled to each other, and there are locations which are close to and apart from each other in the direction of the X-axis. One end of the beam portion 55a and the beam portion 55b is connected to both end portions on a side in the direction of the +Y-axis of the fixing portion 52a, and the other end is connected to both end portions on a side in the direction of the −Y-axis of the mounting portion 51.

Similarly, in respective the beam portions 55c and 55d, the first portion 551 and the second portion 552 are alternately coupled to each other, and there are locations which are close to and apart from each other in the direction of the X-axis. One end of the beam portion 55c and the beam portion 55d is connected to both end portions on a side in the direction of the −Y-axis of the fixing portion 52b, and the other end is connected to both end portions on a side in the direction of the +Y-axis of the mounting portion 51 of the Y-axis side.

Wiring Portion

As illustrated in FIG. 15 or 16, a wire 571D is disposed on the upper surface of the mounting portion 51, the upper surface of the beam portion 55c, and the upper surface of the fixing portion 52b. A wire 572D is disposed on the upper surface of the mounting portion 51, the upper surface of the beam portion 55d, and the upper surface of the fixing portion 52b. A wire 573D is disposed on the upper surface of the mounting portion 51, and the upper surface of the beam portion 55a and the fixing portion 52a. A wire 574D is disposed on the upper surface of the mounting portion 51, the upper surface of the beam portions 55a and 55b, and the upper surface of the fixing portion 52a. A wire 575D is disposed on the upper surface of the mounting portion 51, the upper surface and the lower surface of the beam portions 55a and 55b, and the upper surface of the fixing portion 52a. The wire 575D is disposed in the entire region of the lower surface of the mounting portion 51.

In the present embodiment, the terminals 581, 583, and 585 are located on the −X-axis side of the mounting portion 51, and the terminals 582, 584, and 586 are located on the +X-axis side of the mounting portion 51.

It is preferable that the resonance frequencies of the beam portions 55a, 55b, 55c, and 55d are respectively higher than the resonance frequency of the vibration body 30 as high as at least 10 KHz. In this manner, when the angular velocity ω is applied to the vibration element 3, the shaking of the mounting portion 51 shaken due to the angular velocity ω can be prevented or reduced.

As described above, the board 5D has the plurality of (three in the present embodiment) first portions 551 and the plurality of (two in the present embodiment) second portions 552 in the present embodiment. The first portions 551 and the second portions 552 are coupled to each other. In this manner, it is possible to lengthen the transmission route of stress generated by the package 2 deformed due to the external force. Accordingly, the deformation of the mounting portion 51 can be more effectively reduced. Therefore, it is possible to reduce the variations in the vibration characteristics of the vibration element 3 mounted on the mounting portion 51. In the board 5D, the plurality of beam portions 55a, 55b, 55c, and 55d are respectively connected to corner portions of the mounting portion 51. In this manner, it is possible to particularly reduce the twisting of the mounting portion 51.

The board 5D has the plurality of beam portions 55a, 55b, 55c, and 55d. Accordingly, routes for guiding the wires 571D and 572D serving as the drive system and the wires 573D, 574D, and 575D serving as the detection system can be separated from each other. Accordingly, possibilities that signals from the wires 571D and 572D serving as the drive system may be mixed into signals of the wires 573D, 574D, and 575D serving as the detection system are reduced, and thus, the more accurate detection signal can be transmitted to the IC chip 4. The wires 571D, 572D, 573D, 574D, and 575D are freely designed. This configuration is particularly effective in a case where the angular velocity sensor element having relatively many terminals as in the vibration element 3 is mounted on the mounting portion 51.

The above-described wires 571D, 572D, 573D, 574D, and 575D may be collectively drawn out from one desired beam portion in the beam portions 55a, 55b, 55c, and 55d.

As illustrated in FIG. 8, according to the board 5D, compared to the board X, the stress generated in the mounting region (mounting portion 51) of the vibration element 3 can be decreased. Specifically, the stress can be decreased as much as 90% or more.

Modification Example 1

Figure 18:
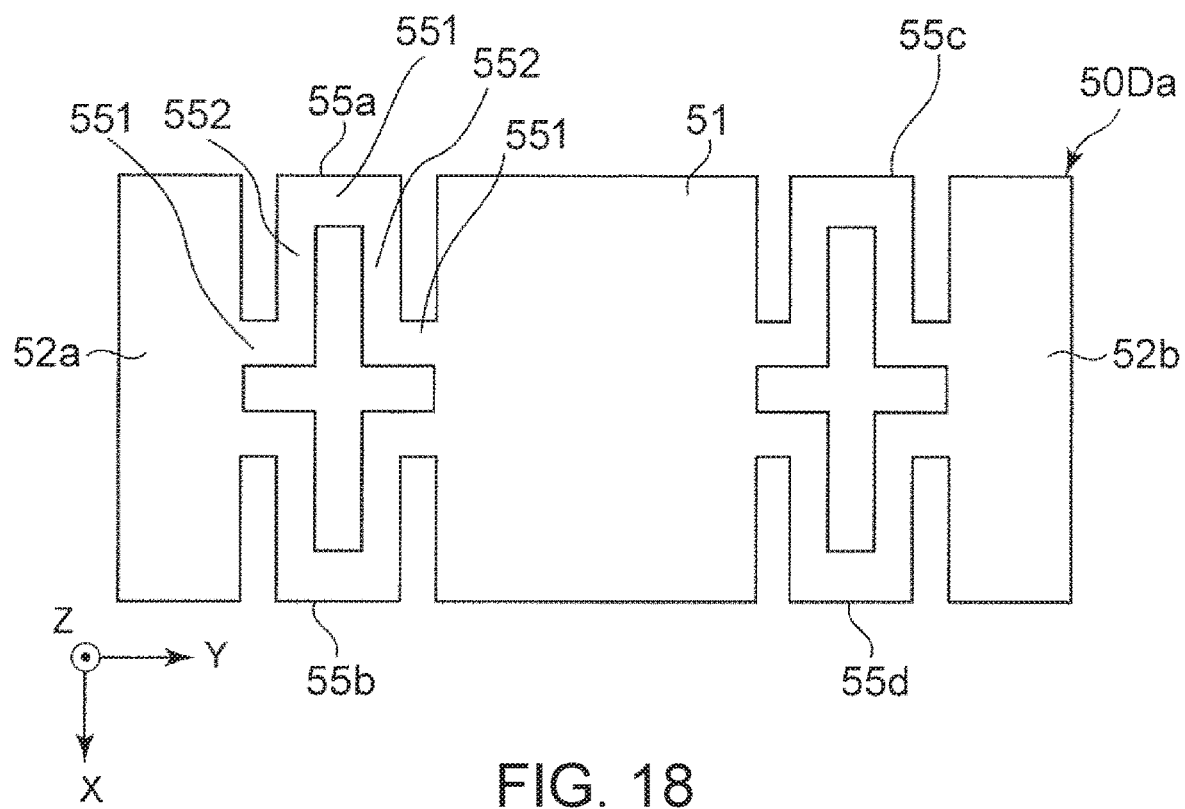
FIG. 18 is a plan view illustrating a modification example of the main body of the board illustrated in FIG. 17.

FIG. 18 is a plan view illustrating a modification example of a main body of the board illustrated in FIG. 17.

As illustrated in FIG. 18, in the beam portion 55a and the beam portion 55b which belong to a main body 50Da, one end is connected to the central portion on a side in the direction of the +Y-axis of the fixing portion 52a, and the other end is connected to the central portion of on a side in the direction of the −Y-axis side of the mounting portion 51. Similarly, in the beam portion 55c and the beam portion 55d, one end is connected to the central portion on a side in the direction of the −Y-axis of the fixing portion 52b, and the other end is connected to the central portion of on a side in the direction of the +Y-axis side of the mounting portion 51. According to the main body 50Da having this configuration, it is also possible to lengthen the transmission route through which the stress generated by the package 2 deformed due to the external force is transmitted to the mounting portion 51. Accordingly, it is possible to reduce the variations in vibration characteristics of the vibration element 3.

Modification Example 2

Figure 19:
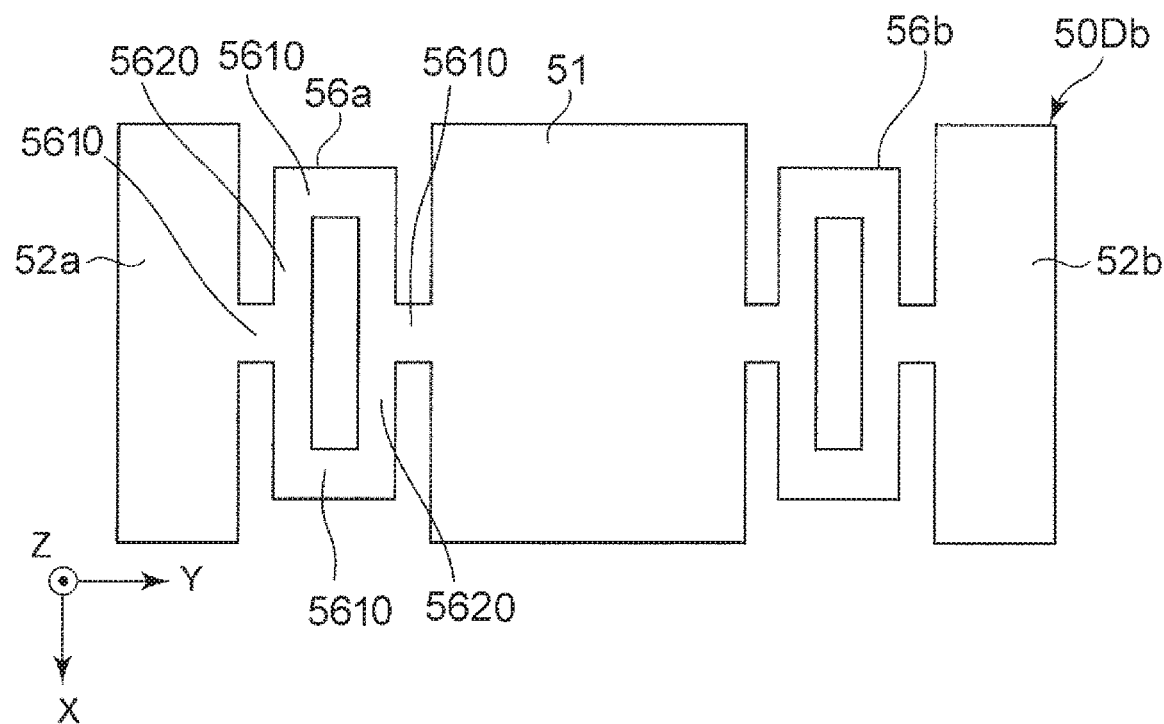
FIG. 19 is a plan view illustrating a modification example of the main body of the board illustrated in FIG. 17.

FIG. 19 is a plan view illustrating a modification example of a main body of the board illustrated in FIG. 17.

As illustrated in FIG. 19, a main body 50Db has two beam portions 56a and 56b. The beam portion 56a couples the fixing portion 52a and the mounting portion 51 to each other, and the beam portion 56b couples the fixing portion 52b and the mounting portion 51 to each other. The beam portion 56a has a shape in which the beam portion 55a and the beam portion 55b of the main body 50Da are integrated with each other. Specifically, the beam portions 56a and 56b respectively have four first portions 5610 which extend along the direction of the Y-axis, and two second portions 5620 which extend along the direction of the X-axis and which are longer than the first portions 5610. According to the main body 50Db having this configuration, it is also possible to lengthen the transmission route through which the stress generated by the package 2 deformed due to the external force is transmitted to the mounting portion 51. Accordingly, it is possible to reduce the variations in vibration characteristics of the vibration element 3.

According to the fifth embodiment as described above, it is also possible to reduce the variations in the vibration characteristics.

First Reference Example

Next, a first reference example will be described.

Figure 20:
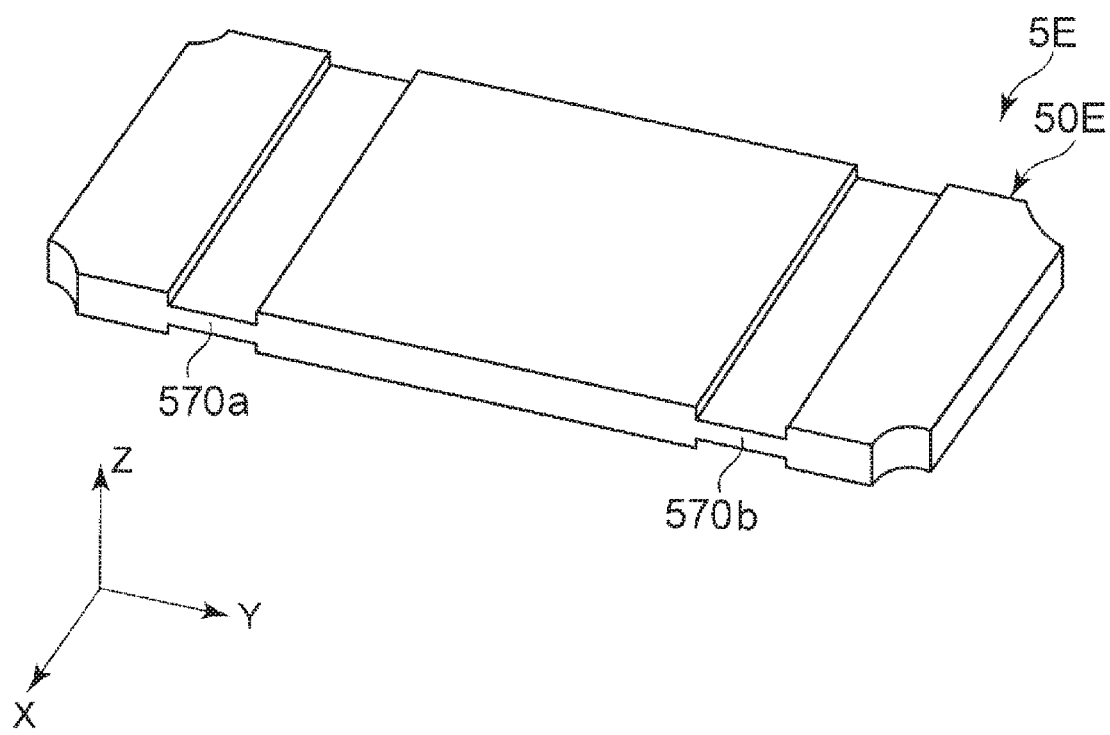
FIG. 20 is a perspective view of a main body of a board belonging to a vibration device according to a first reference example.

FIG. 20 is a perspective view of a main body of a board belonging to the vibration device according to the first reference example.

This reference example is basically the same as the above-described embodiments except that the board has a different configuration. In the following description, the first reference example will be described mainly focusing on points different from those of the above-described embodiments, and similar items will be omitted in description.

A main body 50E of a board 5E illustrated in FIG. 20 has a beam portion 570a which couples the fixing portion 52a and the mounting portion 51 to each other, and a beam portion 570b which couples the fixing portion 52b and the mounting portion 51 to each other. In other words, in the present embodiment, the main body 50E does not have an opening portion (through-hole), and has a flat plate shape which is rectangular in a plan view. The main body 50E has two thin portions (beam portions 570a and 570b) which are thinner than other portions formed along the direction of the X-axis on the +Y-axis side and the −Y-axis side.

In this way, the board 5E has the beam portions 570a and 570b as the thin portions. In this manner, a less rigid portion can be interposed between the fixing portions 52a and 52b and the mounting portion 51. Accordingly, it is possible to adopt a configuration in which the influence of the external force is less likely to be transmitted to the mounting portion 51. Therefore, according to the board 5E, as illustrated in FIG. 8, compared to the board X having uniform thickness, the stress generated in the mounting region (mounting portion 51) of the vibration element 3 can be decreased.

The beam portions 570a and 570b can be formed as follows. For example, patterning of the beam portions 570a and 570b is performed in photo etching. Thereafter, the etching time is shortened. Before the beam portions 570a and 570b penetrate the main body 50E, the beam portions 570a and 570b are removed from an etching solution.

It is also effective to dispose the beam portions 570a and 570b for the boards 5, 5C, and 5D according to the above-described embodiments.

Second Reference Example

Next, a second reference example will be described.

Figure 21:
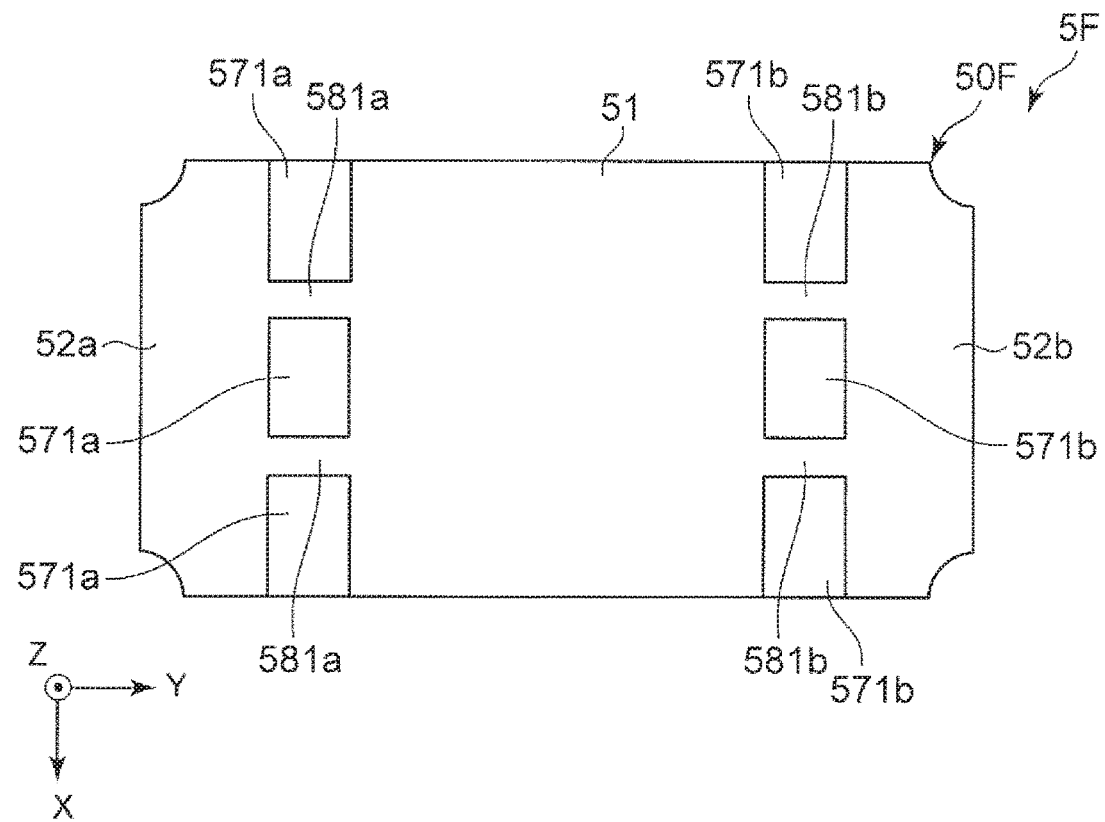
FIG. 21 is a perspective view of a main body of a board belonging to a vibration device according to a second reference example.

FIG. 21 is a plan view of a main body of a board belonging to the vibration device according to the second reference example.

The reference example is basically the same as the above-described embodiments except that the board has a different configuration. In the following description, the second reference example will be described mainly focusing on points different from those of the above-described embodiments, and similar items will be omitted in description.

A main body 50F of a board 5F illustrated in FIG. 21 has three beam portions 571a partially disposed between the fixing portion 52a and the mounting portion 51, and three beam portions 571b partially disposed between the fixing portion 52b and the mounting portion 51. These beam portions 571a and 571b are thin portions, similarly to the beam portions 570a, 570b in the above-described first reference example. That is, in the main body 50F illustrated in FIG. 21, the beam portions 571a serving as the three thin portions are arrayed on the −Y-axis side along the direction of the X-axis, and the beam portions 571b serving as the three thin portions are arrayed on the +Y-axis side along the direction of the X-axis.

In other words, the main body 50F has two portions 581a which are disposed between the fixing portion 52a and the mounting portion 51 and which have the same thickness as the thickness of the fixing portion 52a and the mounting portion 51. Similarly, the main body 50F has two portions 581b which are disposed between the fixing portion 52b and the mounting portion 51 and which have the same thickness as the thickness of the fixing portion 52b and the mounting portion 51.

According to this board 5F, as illustrated in FIG. 8, compared to the board X having uniform thickness, the stress generated in the mounting region (mounting portion 51) of the vibration element 3 can be decreased.

In the main body 50F, the beam portion 571a may not be the thin portion, and may penetrate the location. That is, the fixing portion 52a and the mounting portion 51 may be coupled to each other in the portion 581a. Similarly, the beam portion 571b may not be the thin portion, and may penetrate the location. That is, the fixing portion 52b and the mounting portion 51 may be coupled to each other in the portion 581b. In that case, the portions 581a and 581b function as the beam portions.

Modification Example

Figure 22:
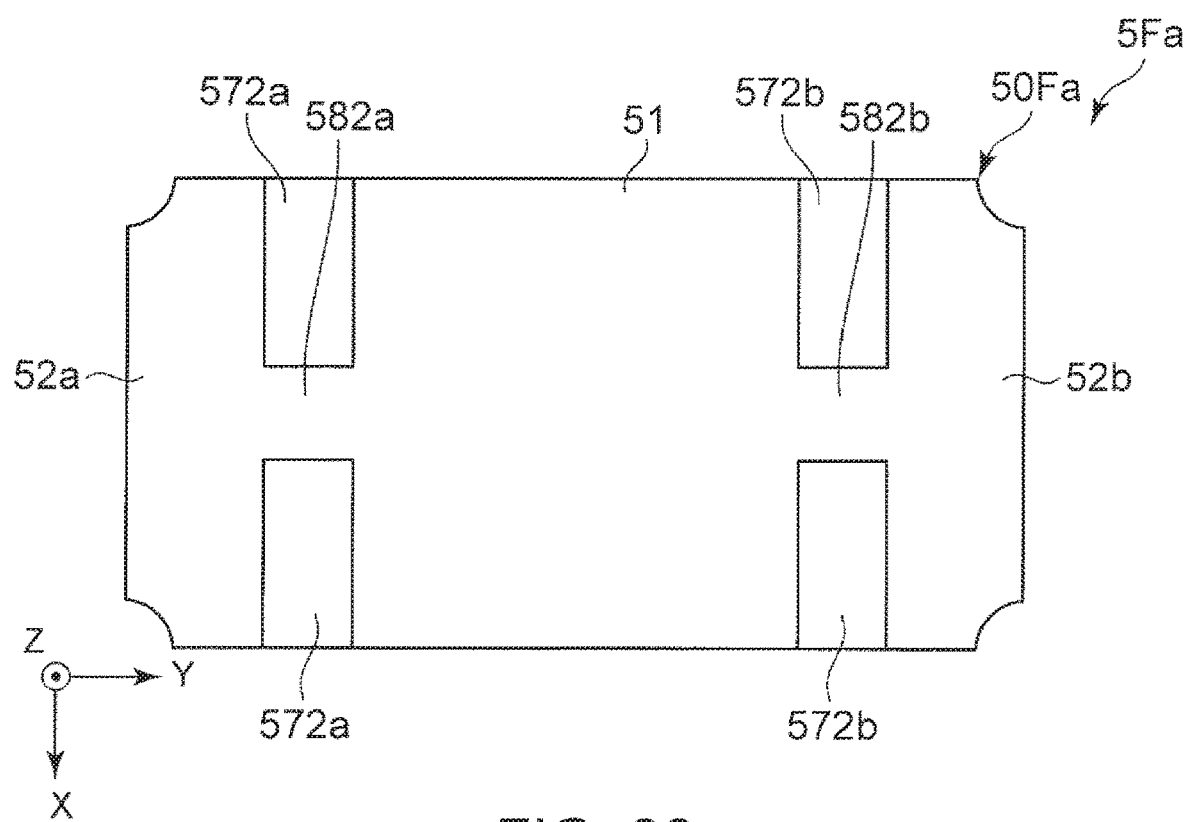
FIG. 22 is a plan view illustrating a modification example of the main body of the board illustrated in FIG. 21.

FIG. 22 is a plan view illustrating a modification example of a main body of the board illustrated in FIG. 21.

In a main body 50Fa illustrated in FIG. 22, beam portions 572a serving as two thin portions are arrayed on the −Y-axis side along the direction of the X-axis, and beam portions 572b serving as two thin portions are arrayed on the +Y-axis side along the direction of the X-axis.

In other words, the main body 50Fa has one portion 582a which is disposed between the fixing portion 52a and the mounting portion 51 and which has the same thickness as the thickness of the fixing portion 52a and the mounting portion 51. Similarly, the main body 50Fa has one portion 582b which is disposed between the fixing portion 52b and the mounting portion 51 and which has the same thickness as the thickness of the fixing portion 52b and the mounting portion 51.

According to the board 5Fa including this main body 50Fa, compared to the board X having uniform thickness, the stress generated in the mounting region (mounting portion 51) of the vibration element 3 can be decreased.

As described above, the thin portion may be partially provided.

Sixth Embodiment

Next, a sixth embodiment will be described.

Figure 23:
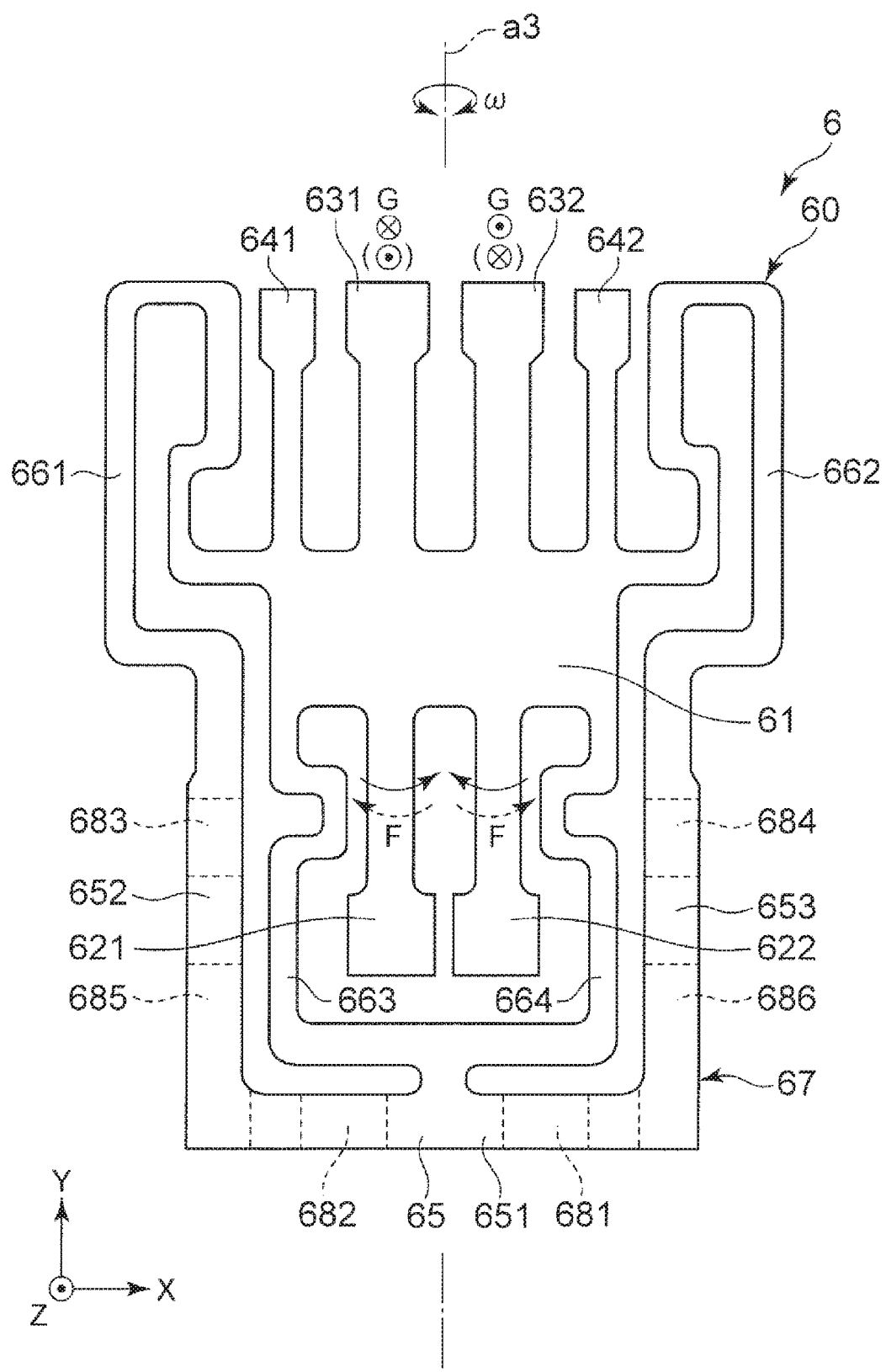
FIG. 23 is a plan view of a vibration element belonging to a vibration device according to a sixth embodiment.

FIG. 23 is a plan view of a vibration element of the vibration device according to the sixth embodiment.

The present embodiment is the same as the above-described embodiments except that the board has a different configuration. In the following description, the sixth embodiment will be described mainly focusing on points different from those of the above-described embodiments, and similar items will be omitted in description.

Vibration Element

The vibration element 6 (vibrator element) illustrated in FIG. 23 is a sensor element for detecting the angular velocity ω around the Y-axis. The vibration element 6 has a vibration body 60 and an electrode unit 67 formed on the surface of the vibration body 60.

Vibration Body

Similarly to the vibration body 30 according to the first embodiment, the vibration body 60 belonging to the vibration element 6 illustrated in FIG. 23 has a spread in the XY-plane defined by the Y-axis (mechanical axis) and the X-axis (electrical axis) which are the crystal axes of the quartz crystal board, and has a plate shape which is thick in the direction of the Z-axis (optical axis).

The vibration body 60 has a base portion 61, a pair of drive vibration arms 621 and 622, a pair of detection vibration arms 631 and 632, a pair of adjustment vibration arms 641 and 642, a support portion 65, and four couplers 661, 662, 663, and 664, and all of these are formed integrally with each other.

The drive vibration arms 621 and 622 are arranged side by side along the direction of the X-axis, and respectively extend from the base portion 61 in the direction of the −Y-axis. The detection vibration arms 631 and 632 are arranged side by side along the direction of the X-axis, and respectively extend from the base portion 61 in the direction of the +Y-axis. The adjustment vibration arms 641 and 642 are arranged side by side in the direction of the X-axis so as to pinch the pair of detection vibration arms 631 and 632, and respectively extend from the base portion 61 in the direction of the +Y-axis. The support portion 65 has an elongated portion 651 which is disposed on a side in the direction of the −Y-axis with respect to the base portion 61, and which extends along the direction of the X-axis, and two portions 652 and 653 extending from both end portions of the portion 651 along the direction of the +Y-axis. The couplers 661, 662, 663, and 664 respectively couple the base portion 61 and the support portion 65 to each other, and have a plurality of portions bent or curved in the middle.

In the illustration, the width (length in the direction of the X-axis) of the tip end portion of the drive vibration arms 621 and 622, the detection vibration arms 631 and 632, and the adjustment vibration arms 641 and 642 is widened. However, the configuration is not limited thereto. For example, the width of the drive vibration arms 621 and 622, the detection vibration arms 631 and 632, and the adjustment vibration arms 641 and 642 may be constant. The drive vibration arms 621 and 622, the detection vibration arms 631 and 632, and the adjustment vibration arms 641 and 642 may have a pair of bottomed grooves open to the upper surface and the lower surface and extending in the direction of the Y-axis.

Electrode Unit

The electrode unit 67 has an electrode pattern (not illustrated) disposed on the surface of the vibration body 60, and a plurality of terminals 681, 682, 683, 684, 685, and 686.

Although not illustrated, an electrode pattern has a drive signal electrode and a drive ground electrode which are disposed in the drive vibration arms 621 and 622, a detection signal electrode and a detection ground electrode which are disposed in the detection vibration arms 631 and 632, and an adjustment electrode for adjusting an output of a detection signal electrode disposed in the adjustment vibration arms 641 and 642.

A terminal 681 (drive ground terminal) is disposed on the lower surface of the portion 651 of the support portion 65. A terminal 682 (drive ground terminal) is disposed on the lower surface of the portion 651 of the support portion 65. A terminal 683 (detection signal terminal) is disposed on the lower surface of the portion 652 of the support portion 65, and a terminal 684 (detection signal terminal) is disposed on the lower surface of the portion 653 of the support portion 65. A terminal 685 (detection ground terminal) is disposed on the lower surface of the portion 652 of the support portion 65, and a terminal 686 (detection ground terminal) is disposed on the lower surface of the portion 653 of the support portion 65.

A configuration material of the electrode unit 67 as described above is not particularly limited as long as the material is conductive. Specifically, for example, it is possible to use the above-described material for the electrode unit 37 of the vibration element 3 according to the first embodiment.

In this vibration element 6, in a state where the angular velocity ω is not applied to the vibration element 6, a drive signal is input to the drive signal electrode. In this manner, if an electric field is generated between the drive signal electrode and the drive ground electrode, the drive vibration arms 621 and 622 perform flexural vibration (drive vibration) so that both of these are opposite to each other in the direction of the X-axis as indicated by an arrow F in FIG. 23.

In a state where this drive vibration is performed, if the angular velocity ω around a central axis a3 extending along the direction of the Y-axis is applied to the vibration element 6, the Coriolis' force is applied to the drive vibration arms 621 and 622, and the drive vibration arms 621 and 622 perform flexural vibration so as to face mutually opposite directions in the direction of the Z-axis. As a result, the detection vibration arms 631, 632 perform flexural vibration (detection vibration) so as to face mutually opposite directions in the direction of the Z-axis as indicated by an arrow G in FIG. 1. Due to this detection vibration, a charge generated in the detection vibration arms 631 and 632 is extracted as a detection signal output from the detection signal electrode, and the angular velocity ω is obtained, based on this detection signal.

Here, regardless of the presence or absence of the detection vibration, in accordance with the drive vibration of the drive vibration arms 621 and 622, the adjustment vibration arms 641 and 642 perform the flexural vibration so as to face mutually opposite directions in the direction of the X-axis.

A charge generated between the detection signal electrode and the detection ground electrode and the detection signal electrode, and the adjustment electrode in accordance with the flexural vibration of the adjustment vibration arms 641 and 642 is superimposed on the detection signal. In this manner, for example, the detection signal can be adjusted so that the detection signal is set to zero when the angular velocity ω is not applied thereto.

Even in a case of using this vibration element 6, since the vibration element 6 includes the board (for example, the board 5) according to the present application example, the deformation of package 2 is less likely to be transmitted to the vibration element 3. Accordingly, it is possible to reduce the variations in the vibration characteristics. In a case of using the vibration element 6, although not illustrated, for example, the arrangement of the terminals of the board 5 may be disposed at positions corresponding to the terminals 681, 682, 683, 684, 685, and 686 of the vibration element 6. In this way, for example, the pattern of the wiring portion of the board 5 is set and changed to match the vibration element 6. In this manner, the vibration element 6 can be connected to (mounted on) the package 2. Therefore, it is possible to prevent productivity from becoming poor due to a change in the pattern.

According to the sixth embodiment as described above, it is also possible to reduce the variations in the vibration characteristics.

Seventh Embodiment

Next, a seventh embodiment will be described.

Figure 24:
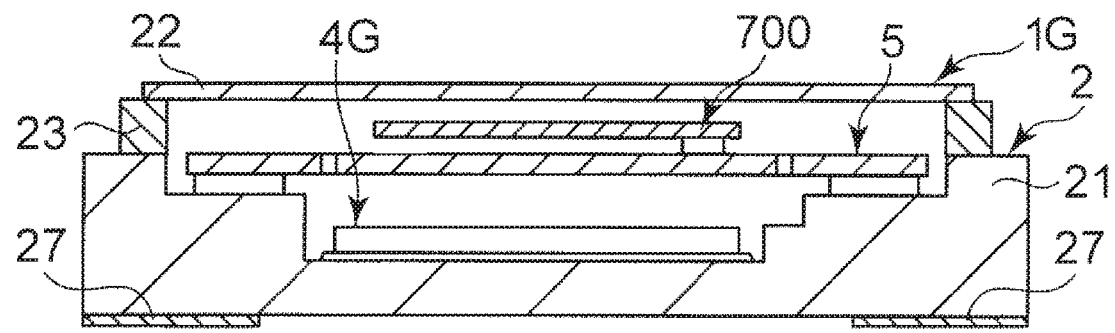
FIG. 24 is a sectional view of a vibration device according to a seventh embodiment.
Figure 25:
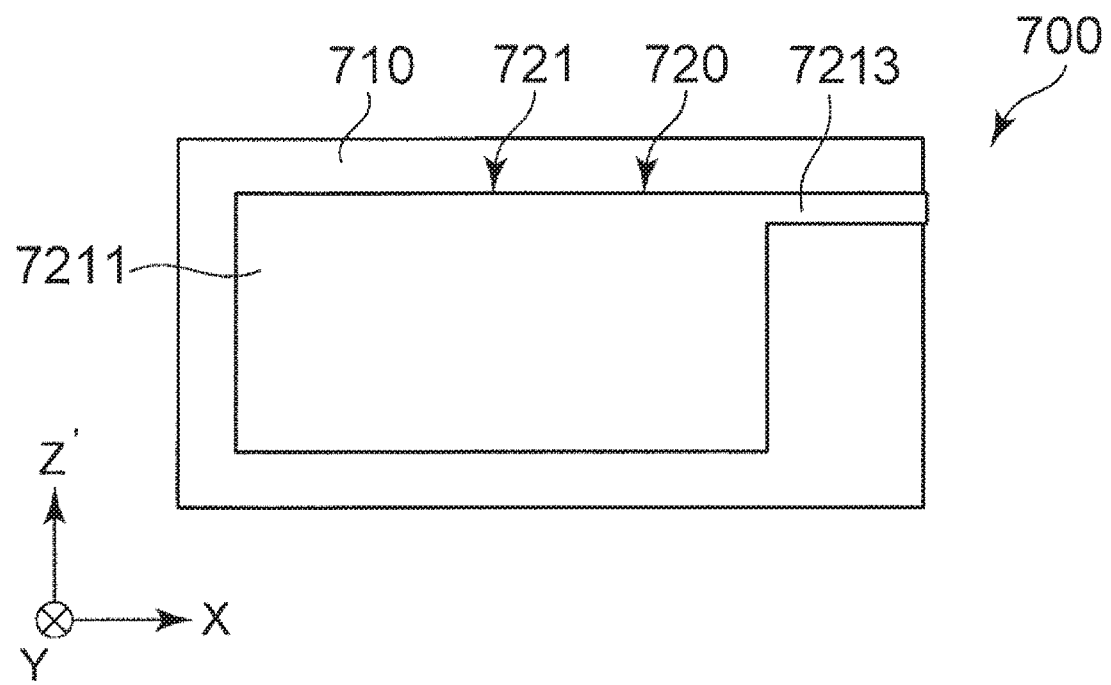
FIG. 25 is a plan view of the vibration element illustrated in FIG. 24.
Figure 26:
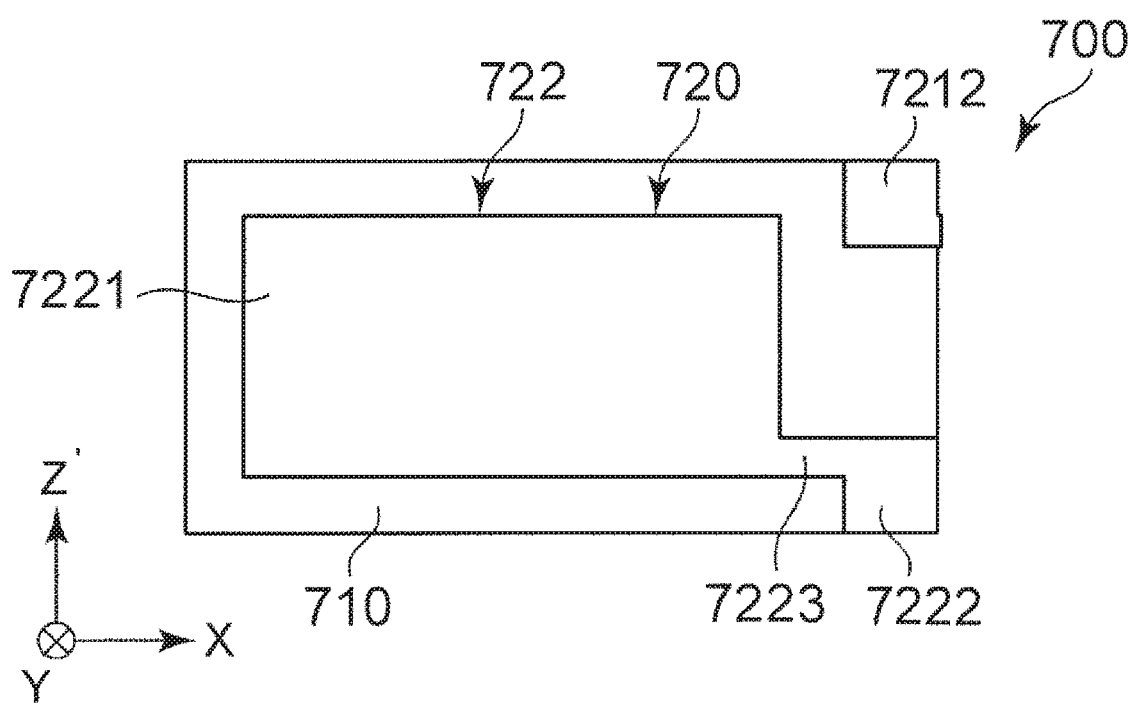
FIG. 26 is a plan view (transparent view) of the vibration element illustrated in FIG. 24.

FIG. 24 is a sectional view of a vibration device according to the seventh embodiment. FIG. 25 is a plan view of a vibration element illustrated in FIG. 24. FIG. 26 is a plan view (transparent view) of the vibration element illustrated in FIG. 24.

In the present embodiment, the vibration device according to the present application example is used as an oscillator. In the following description, the seventh embodiment will be described mainly focusing on points different from those of the above-described embodiments, and similar items will be omitted in description.

A vibration device 1G illustrated in FIG. 24 is the oscillator, and has the package 2, the board 5, a vibration element 700, and an IC chip 4G (electronic component).

IC Chip (Electronic Component)

The IC chip 4G illustrated in FIG. 24 has an oscillation circuit for controlling the drive of the vibration element 700. If the IC chip 4G drives the vibration element 700, a signal having a predetermined frequency can be extracted.

Vibration Element

The vibration element 700 illustrated in FIGS. 25 and 26 has a vibration body 710 (piezoelectric board) having an oblong (rectangular) plate shape in a plan view, and an electrode unit 720 formed on the surface of the vibration body 710.

Vibration Body

The vibration body 710 is a quartz crystal raw board which mainly performs thickness-shear vibration. In the present embodiment, the vibration body 710 is an AT cut quartz crystal board. AT cut means cutting so that the quartz crystal board has a principal plane (principal plane including the X-axis and the Z'-axis) obtained by rotating a plane (Y-plane) including the X-axis and the Z-axis which are the crystal axis of quartz crystal as large as approximately 35.15 degrees in a counterclockwise direction from the Z-axis around the X-axis. The longitudinal direction of the vibration body 710 coincides with the X-axis serving as the crystal axis of quartz crystal.

The electrode unit 720 has a pair of electrode pattern portions 721 and 722. The electrode pattern portion 721 has an electrode 7211 (excitation electrode) formed on the upper surface of the vibration body 710, a terminal 7212 formed on the lower surface of the vibration body 710, and a wire 7213 for electrically connecting the electrode 7211 and the terminal 7212 to each other. The electrode pattern portion 722 has an electrode 7221 (excitation electrode) formed on the lower surface of the vibration body 710, a terminal 7222 formed on the upper surface of the vibration body 710, and a wire 7223 for electrically connecting the electrode 7221 and the terminal 7222 to each other. The electrodes 7211 and 7221 have substantially the same shape via the vibration body 710, and overlap each other when viewed in a thickness direction of the vibration body 710.

In this vibration element 700, if an alternating voltage is applied between the electrode 7211 and the electrode 7221, the vibration body 710 vibrates at a predetermined frequency in the direction of the Y-axis.

In this vibration device 1G, the vibration element 700 also includes the board (for example, the board 5) according to the present application example. Accordingly, the deformation of the package 2 is less likely to be transmitted to the vibration element 700, and a holding state of the vibration element 700 is not changed. Thus, it is possible to reduce the variations in the vibration characteristics. Therefore, since the oscillation frequency does not vary, it is possible to provide the more accurate oscillation frequency having a satisfactory C/N ratio.

In a case of using the vibration element 700, although not illustrated, for example, the arrangement of the terminals included in the board 5 may be disposed at positions corresponding to the terminals 7212 and 7222 of the vibration element 700. In this way, the pattern of the wiring portion 57 of the board 5 is set and changed to match the vibration element 700. In this manner, the vibration element 700 can be connected to (mounted on) the package 2.

Another Example of Vibration Element

Figure 27:
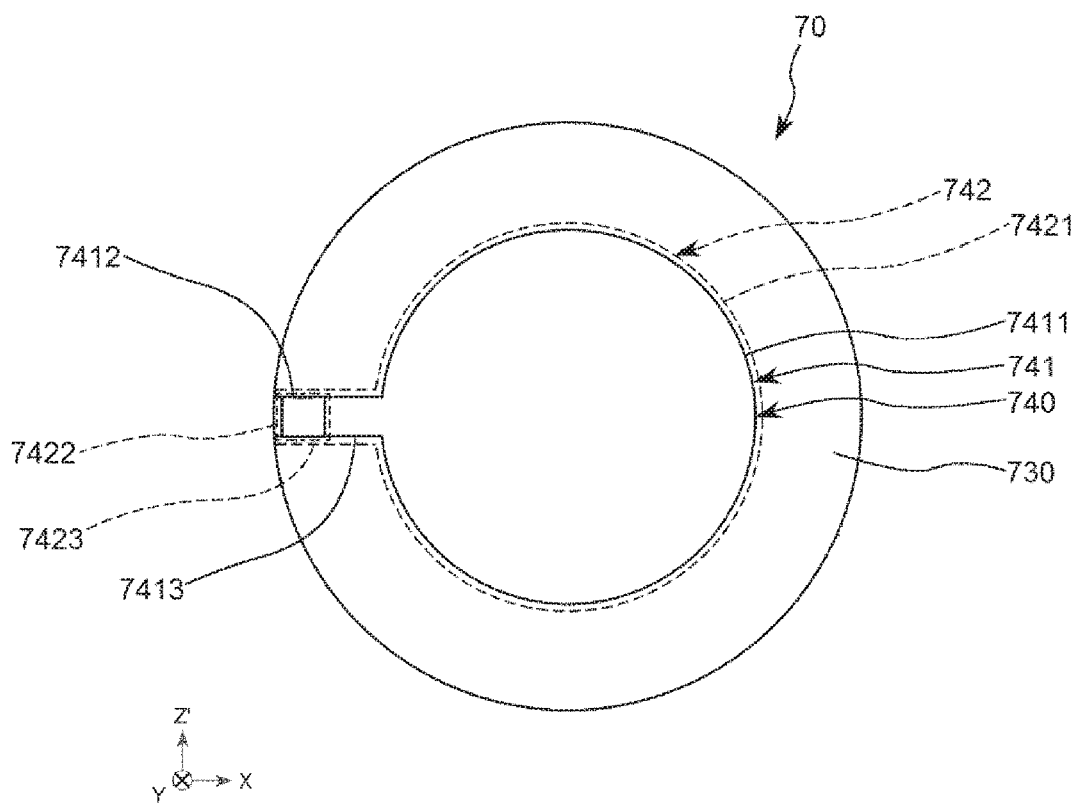
FIG. 27 illustrates another example of the vibration element illustrated in FIG. 24.

FIG. 27 illustrates another example of a vibration element illustrated in FIG. 24.

As illustrated in FIG. 27, a vibration element 70 has a vibration body 730 and an electrode unit 740 disposed in the vibration body 730. This vibration element 70 is suitable to a case where the vibration device 1G serving as the oscillator is an oven controlled crystal oscillator (OCXO) including a temperature control element (not illustrated) for controlling the temperature of the vibration element 70.

The vibration body 730 has a substantially circular shape in a plan view, which is formed by performing etching and machining on the SC cut quartz crystal board. The vibration body 730 obtained by cutting the SC cut quartz crystal board into the circular shape is used. Accordingly, it is possible to obtain the vibration element 70 which has particularly low frequency jump or resistance rise caused by spurious vibration and which has particularly stable temperature characteristics. A shape of the vibration body 730 in a plan view is not limited to the circular shape. The vibration body 730 may have a nonlinear shape such as an ellipse shape and an oval shape, or a linear shape such as a triangular shape and a rectangular shape.

The electrode unit 740 has a pair of electrode pattern portions 741 and 742. The electrode pattern portion 741 has an electrode 7411 (excitation electrode) formed on the upper surface of the vibration body 730, a terminal 7412 formed on the upper surface of the vibration body 730, and a wire 7413 for electrically connecting the electrode 7411 and the terminal 7412 to each other. The electrode pattern portion 742 has an electrode 7421 (excitation electrode) formed on the lower surface of the vibration body 730, a terminal 7422 formed on the lower surface of the vibration body 730, and a wire 7423 for electrically connecting an electrode 7421 and the terminal 7422 to each other. The electrodes 7411 and 7421 have substantially the same shape via the vibration body 730, and overlap each other when viewed in the thickness direction of the vibration body 730.

In the vibration device 1G including vibration element 70, the vibration device 1G also includes the board (for example, the board 5) according to the present application example. Accordingly, the deformation of the package 2 is less likely to be transmitted to the vibration element 70, and a holding state of the vibration element 70 is not changed. Thus, it is possible to reduce the variations in the vibration characteristics. Therefore, since the oscillation frequency does not vary, it is possible to provide the more accurate oscillation frequency having a satisfactory C/N ratio.

In a case of using the vibration element 70, although not illustrated, for example, the arrangement of the terminals included in the board 5 may be disposed at positions corresponding to the terminals 7412 and 7422 of the vibration element 70. In this way, for example, the pattern of the wiring portion of the board 5 is set and changed to match the vibration element 70. In this manner, the vibration element 70 can be connected to (mounted on) the package 2.

The vibration device 1G is also applicable to a temperature compensated crystal oscillator (TCXO), for example. The vibration element included in the vibration device 1G is not limited to the vibration element 700 using the above-described AT cut quartz crystal board or the vibration element 70 using the SC cut quartz crystal board. For example, the vibration element may use a BT cut quartz crystal vibration board.

According to the seventh embodiment as described above, it is also possible to reduce the variations in the vibration characteristics.

Eighth Embodiment

Next, an eighth embodiment will be described.

Figure 28:
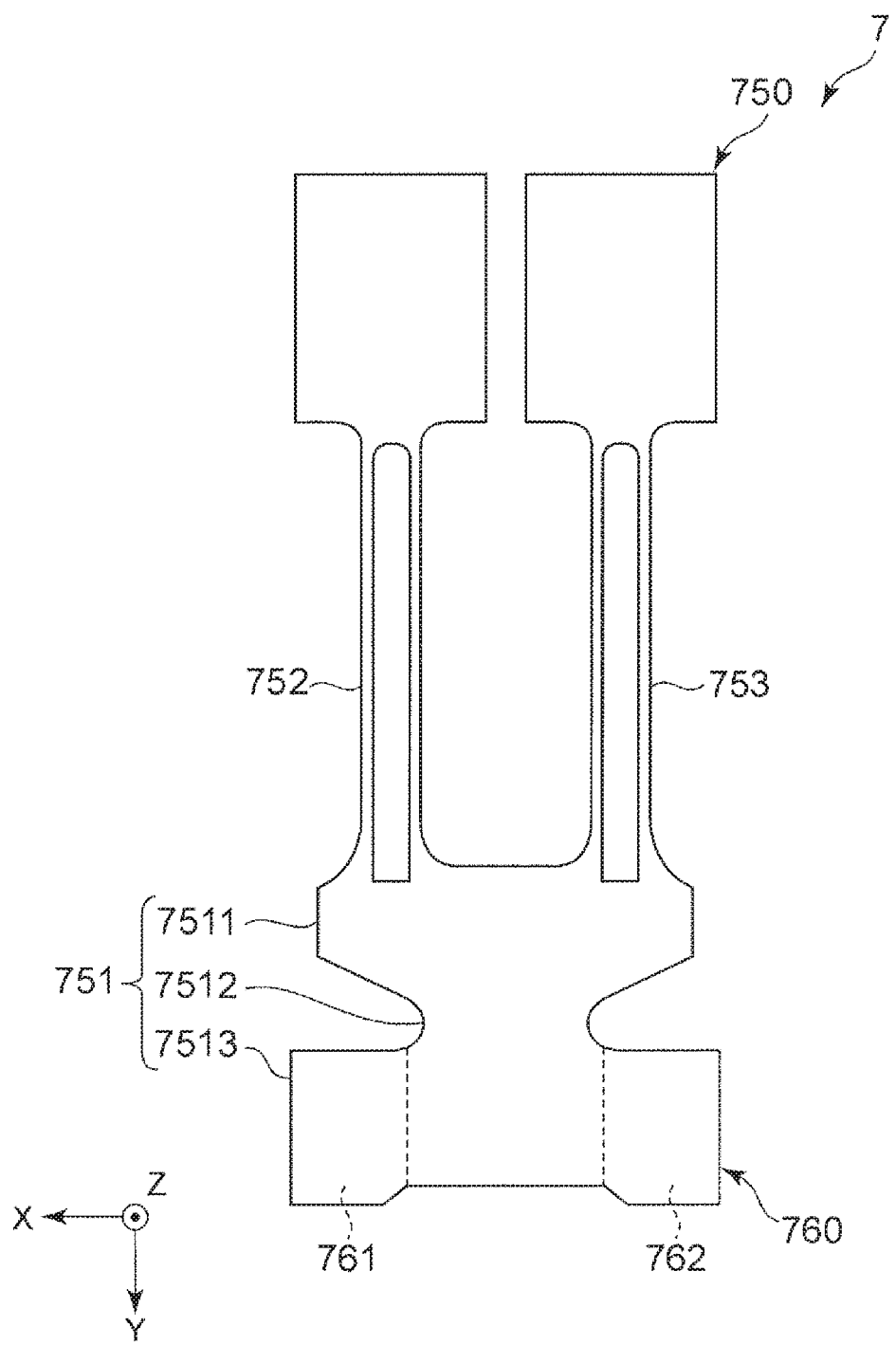
FIG. 28 is a plan view of a vibration element belonging to a vibration device according to an eighth embodiment.

FIG. 28 is a plan view of a vibration element of a vibration device according to the eighth embodiment.

The present embodiment is the same as the above-described embodiments except that the board has a different configuration. In the following description, the eighth embodiment will be described mainly focusing on points different from those of the above-described embodiments, and similar items will be omitted in description.

The vibration element 7 (vibrator element) illustrated in FIG. 28 has a vibration body 750 and an electrode unit 760 formed on the surface of the vibration body 750.

Vibration Body

The vibration body 750 is configured to include a Z cut quartz crystal board. The vibration body 750 has a base portion 751 and a pair of vibration arms 752 and 753 extending from the base portion 751.

The base portion 751 includes a first base portion 7511 from which the vibration arms 752 and 753 extend, a second base portion 7513 disposed on a side opposite to the vibration arms 752 and 753 with respect to the first base portion 7511, and a coupler 7512 for coupling the first base portion 7511 and the second base portion 7513 to each other. The coupler 7512 is located between the first base portion 7511 and the second base portion 7513, and has a smaller width (length in the direction of the X-axis) than that of the first base portion 7511. In this manner, it is possible to minimize vibration leakage while shortening the length extending along the direction of the Y-axis of the base portion 751. The vibration arms 752 and 753 respectively extend from the base portion 751 in the direction of the Y-axis so as to be arranged side by side in the direction of the X-axis and parallel to each other.

In the illustration, the width of the tip end portion of the vibration arms 752 and 753 (length in the direction of the X-axis) is wider than that of the base end portion. However, the configuration is not limited thereto. The vibration arms 752 and 753 have a pair of bottomed grooves open on the upper surface and the lower surface and extending in the direction of the Y-axis. However, these grooves may not be formed.

Electrode Unit

An electrode unit 760 has an electrode pattern (not illustrated) disposed on the surface of the vibration body 750, and a plurality of terminals 761 and 762.

Although not illustrated, the electrode pattern has a first drive electrode and a second drive electrode which are disposed in the vibration arms 752 and 753. The terminals 761 and 762 are disposed on the lower surface of the second base portion 7513.

In this vibration element 7, if an alternating voltage is applied between the first drive electrode and the second drive electrode, the vibration arms 752 and 753 vibrate at a predetermined frequency in an in-plane direction (direction of the XY-plane) so that the vibration arms 752 and 753 repeatedly move close to and move away from each other.

According to the eighth embodiment as described above, it is also possible to reduce the variations in the vibration characteristics.

Ninth Embodiment

Next, a ninth embodiment will be described.

Figure 29:
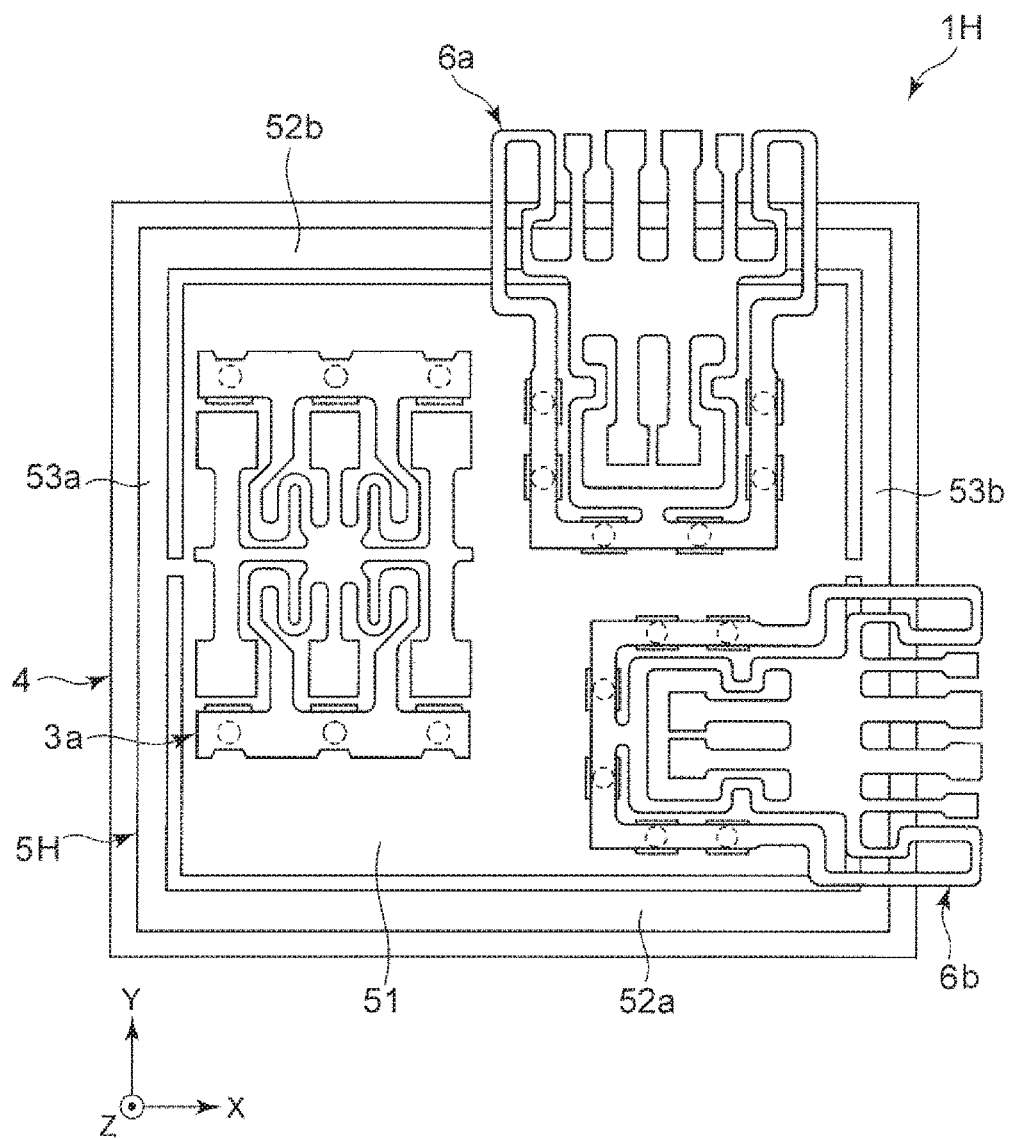
FIG. 29 is a plan view of a vibration device according to a ninth embodiment.

FIG. 29 is a plan view of a vibration device according to the ninth embodiment.

The present embodiment is basically the same as the above-described embodiments except that the vibration device a plurality of vibration elements. In the following description, the ninth embodiment will be described mainly focusing on points different from those of the above-described embodiments, and similar items will be omitted in description.

A vibration device 1H illustrated in FIG. 29 is a three-axis angular velocity sensor. Angular velocity (Ox around the X-axis, angular velocity ωy around the Y-axis, and angular velocity ωz around the Z-axis can be detected independent of each other.

This vibration device 1H has three vibration elements 3a, 6a, and 6b, and a board 5H on which the three vibration elements 3a, 6a, and 6b are collectively mounted. In the present embodiment, the board 5H is mounted on the IC chip 4.

The vibration element 3a has a configuration which is the same as that of the vibration element 3 in the above-described first embodiment, and detects the angular velocity ωz. On the other hand, the vibration elements 6a and 6b have a configuration which is the same as that of the vibration element 6 in the above-described sixth embodiment. However, the vibration elements 6a and 6b are differently arranged so as to detect the angular velocity around the respective axes of the X-axis and the Y-axis. The vibration element 6a detects the angular velocity ωy, and the vibration element 6b detects the angular velocity ωx.

These three vibration elements 3a, 6a, and 6b are collectively mounted on the mounting portion 51 of one board 5H (vibration element according to the present application example). Accordingly, although not illustrated, the board 5H includes a plurality of terminals corresponding to a plurality of terminals belonging to the three vibration elements 3a, 6a, and 6b.

The three vibration elements 3a, 6a, and 6b are collectively arranged on one board 5H as in this vibration device 1H. In this manner, the vibration device 1H can be downsized.

Modification Example

Figure 30:
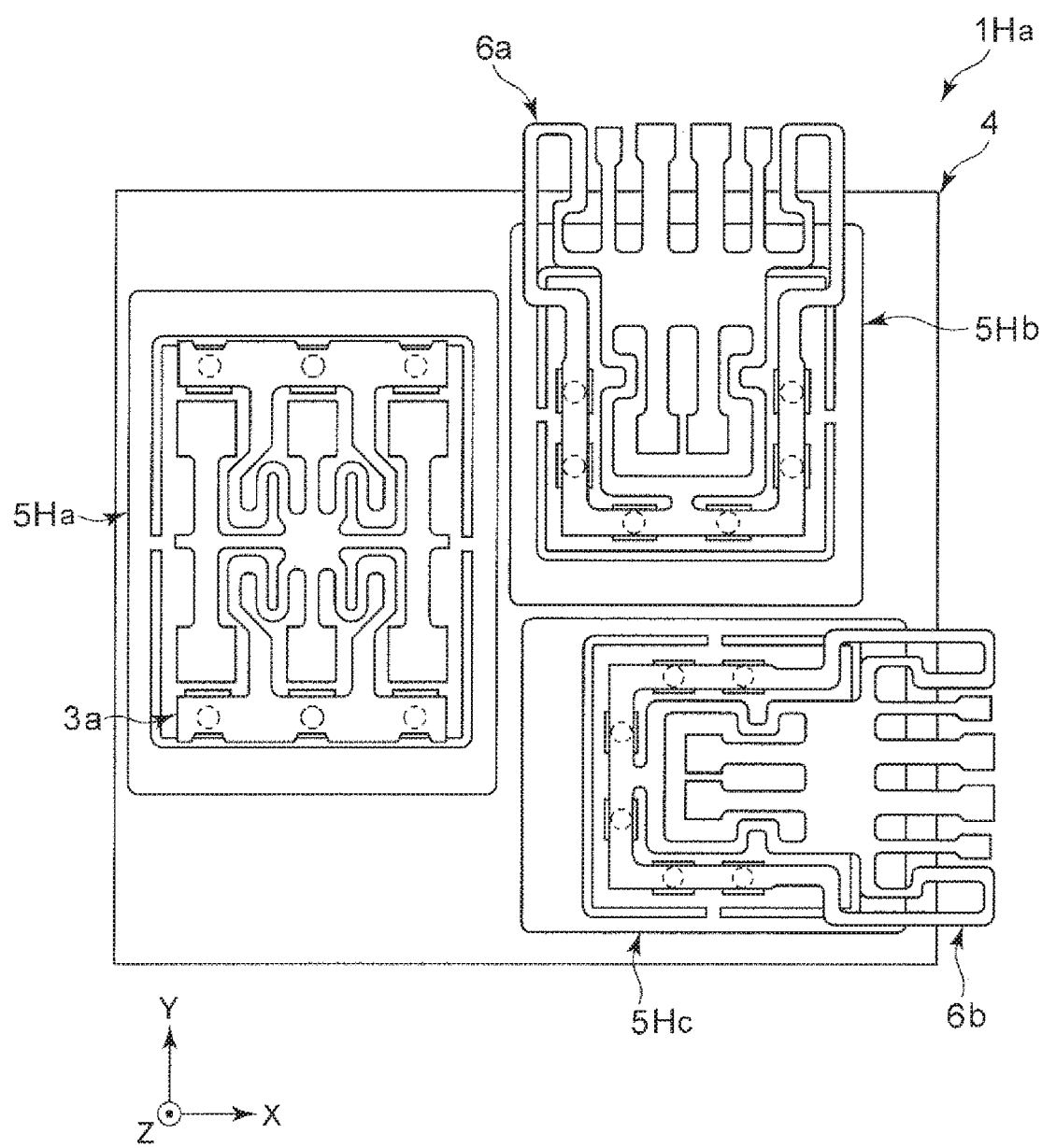
FIG. 30 illustrates another example of a board illustrated in FIG. 29.

FIG. 30 illustrates another example of the board illustrated in FIG. 29.

As illustrated in FIG. 30, a vibration device 1Ha has boards 5Ha, 5Hb, and 5Hc disposed for each of the vibration elements 3a, 6a, and 6b. That is, the vibration element 3a is mounted on the board 5Ha, the vibration element 6a is mounted on the board 5Hb, and the vibration element 6b is mounted on the board 5Hc. In this case, a wire (not illustrated) drawn from the mounting portion 51 to the IC chip 4 in each of the boards 5Ha, 5Hb, and 5Hc is divided for each of the vibration elements 3a, 6a, and 6b. Accordingly, compared to a case where a wire (not illustrated) of a plurality of the vibration elements 3a, 6a, and 6b is drawn from one board 5H as in the above-described vibration device 1H illustrated in FIG. 29, each wiring portion (not illustrated) of the boards 5Ha, 5Hb, and 5Hc is more freely designed.

According to the ninth embodiment as described above, it is also possible to reduce the variations in the vibration characteristics.

Tenth Embodiment

Next, a tenth embodiment will be described.

Figure 31:
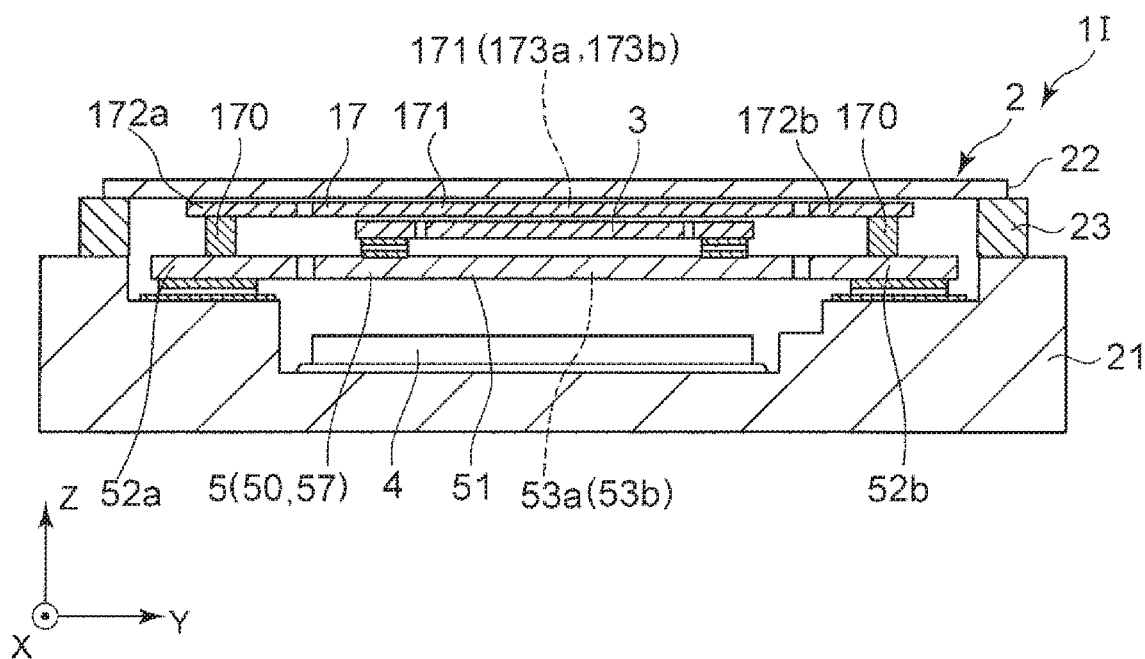
FIG. 31 is a sectional view illustrating a vibration device according to a tenth embodiment.

FIG. 31 is a sectional view illustrating a vibration device according to the tenth embodiment.

The present embodiment is the same as the above-described embodiments except that the vibration device includes two boards. In the following description, the tenth embodiment will be described mainly focusing on points different from those of the above-described embodiments, and similar items will be omitted in description.

As illustrated in FIG. 31, a vibration device 1I has aboard 17 (board) disposed above the vibration element 3. The board 17 is located between the lid 22 and the vibration element 3, and is disposed apart from the lid 22 and the vibration element 3. The board 17 has a rectangular shape is in a plan view, and overlaps the vibration element 3 so as to enclose the vibration element 3. In the present embodiment, this board 17 is connected to the fixing portions 52a and 52b of the board 5 via a connection member 170 formed of an adhesive, for example.

A configuration material of the board 17 is not particularly limited. For example, it is preferable to use an insulating material such as quartz crystal, silicone, or ceramics. In particular, as the configuration material of the board 17, it is preferable to use a material which is the same as the configuration material of the vibration body 30 and the main body 50 of the board 5. In this manner, it is possible to reduce a difference in thermal expansion between the board 17, the vibration element 3, and the board 5, and it is possible to reduce the thermal stress resulting from the difference in thermal expansion therebetween. In the present embodiment, the vibration body 30 and the main body 50 are configured to include the quartz crystal as described above. Therefore, as the configuration material of the board 17, it is preferable to use the quartz crystal.

Since the vibration device 1I includes this board 17, it is possible to reduce possibilities that the lid 22 may be deformed when an external force is applied to the package 2, for example, that the parasitic capacitance may be changed between the vibration element 3 and the lid 22 changes, and that the characteristics of the vibration element 3 may be affected. According to this board 17, the parasitic capacitance (distribution of electric force lines) around the vibration element 3 is not changed.

It is preferable that the board 17 has a configuration which is the same as that of the board 5. That is, it is preferable that the board 17 has a portion 171 corresponding to the mounting portion 51, two portions 172a and 172b corresponding to the fixing portions 52a and 52b, and portions 173a and 173b corresponding to the beam portions 53a and 53b. In this manner, it is possible to minimize the displacement between the mounting portion 51 of the board 5 and the portion 171 of the board 17. Accordingly, it is possible to further reduce the variations in the vibration characteristics of the vibration element 3. Therefore, according to the vibration device 1I, it is possible to realize the angular velocity sensor which is more robust against the external force.

In the present embodiment, the board 17 does not include the electrode unit, unlike the board 5. However, the electrode unit may be formed on the surface of the board 17. In this manner, the vibration element 3 may be excited using an electric field generated between the electrode unit 37 of the board 5 and the electrode unit (not illustrated) of the board 17.

The board 17 may be a flat plate-shaped member which does not have a hole or a groove. In the illustration, the board 17 is connected to the fixing portions 52a and 52b of the board 5. However, the board 17 may be connected to the mounting portion 51 of the board 5. In this case, even if the board 17 is the flat plate-shaped member which does not have a hole or a groove, it is possible to minimize the displacement between the mounting portion 51 of the board 5 and the board 17. Therefore, it is possible to more effectively reduce the variations in the vibration characteristics of the vibration element 3.

According to the tenth embodiment as described above, it is also possible to reduce the variations in the vibration characteristics.

2. Module Including Vibration Device

Next a module including the vibration device according to the present application example will be described.

Figure 32:
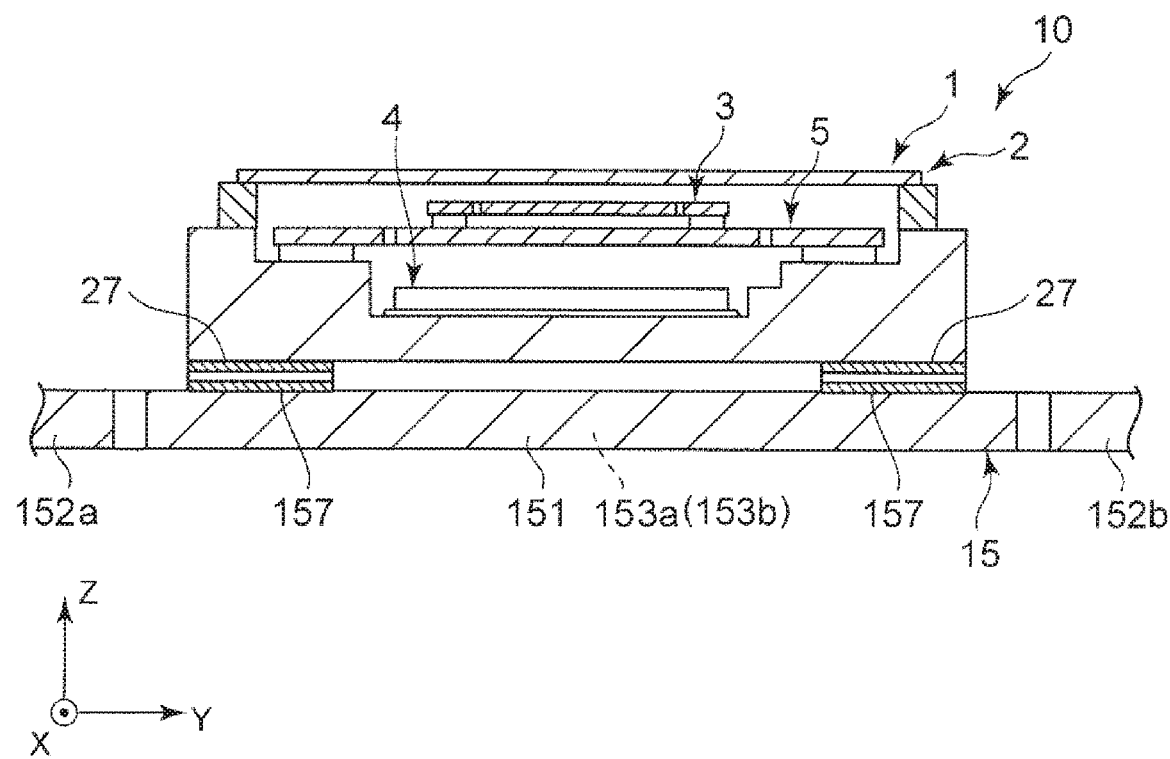
FIG. 32 is a sectional view illustrating a module including a vibration device.

FIG. 32 is a sectional view illustrating the module including the vibration device.

As illustrated in FIG. 32, a module 10 has a vibration device (for example, the vibration device 1) according to the present application example, and a mounting board 15 on which the vibration device is mounted. This vibration device 1 is connected to a terminal 157 disposed in the mounting board 15, for example, via a conductive adhesive by using an external connection terminal 27 disposed on the lower surface (rear side). In this manner, the vibration device 1 is mounted on the mounting board 15. The mounting board 15 is not particularly limited. For example, as the mounting board 15, it is possible to use a printed circuit board having a circuit formed thereon.

In the present embodiment, the mounting board 15 has a configuration which is the same as that of the board 5. That is, the mounting board 15 has a portion 151 corresponding to the mounting portion 51, two portions 152a and 152b corresponding to the fixing portions 52a and 52b, and portions 153a and 153b corresponding to the beam portions 53a and 53b. The vibration device 1 is then mounted on the portion 151 of the mounting board 15. In this manner, it is possible to minimize the displacement of the portion 151 of the mounting board 15 which is caused by the external force (including thermal stress). Accordingly, it is possible to more effectively reduce possibilities that the vibration device 1 may be affected by the external force. Therefore, it is possible to realize the module 10 including a robust angular velocity sensor.

3. Electronic Device

Next, an electronic device including the vibration device according to the present application example will be described.

Figure 33:
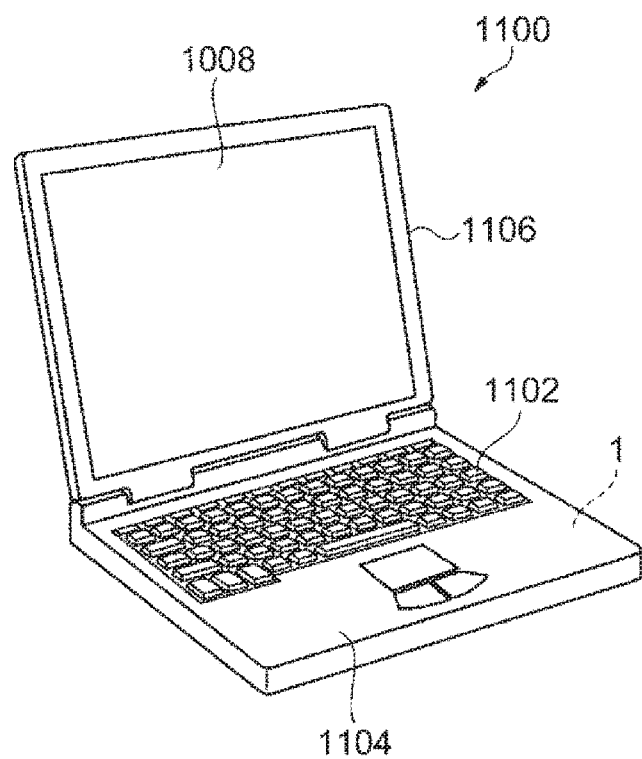
FIG. 33 is a perspective view illustrating a configuration of a mobile-type (or notebook-type) personal computer to which an electronic device according to the present application example is applied.

FIG. 33 is a perspective view illustrating a configuration of a mobile (or notebook) personal computer to which the electronic device according to the present application example is applied.

In this drawing, a personal computer 1100 is configured to include a main body 1104 including a keyboard 1102, and a display unit 1106 including a display portion 1008. The display unit 1106 is supported so as to be pivotable around the main body 1104 via a hinge structure portion. This personal computer 1100 is internally equipped with the vibration device (for example, the vibration device 1) according to the present application example.

Figure 34:
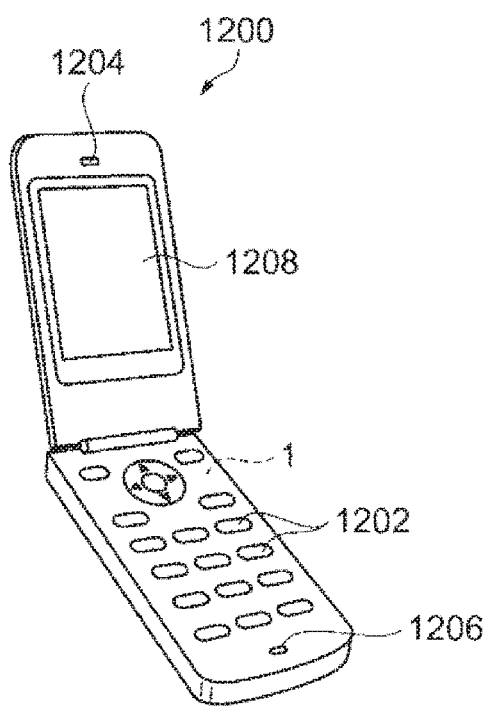
FIG. 34 is a perspective view illustrating a configuration of a mobile phone (including a PHS) to which the electronic device according to the present application example is applied.

FIG. 34 is a perspective view illustrating a configuration of a mobile phone (including a PHS) to which the electronic device according to the present application example is applied.

In this drawing, a mobile phone 1200 includes an antenna (not illustrated), a plurality of operation buttons 1202, an earpiece 1204, and a mouthpiece 1206. A display portion 1208 is disposed between the operation button 1202 and the earpiece 1204. This mobile phone 1200 is internally equipped with the vibration device (for example, the vibration device 1) according to the present application example.

Figure 35:
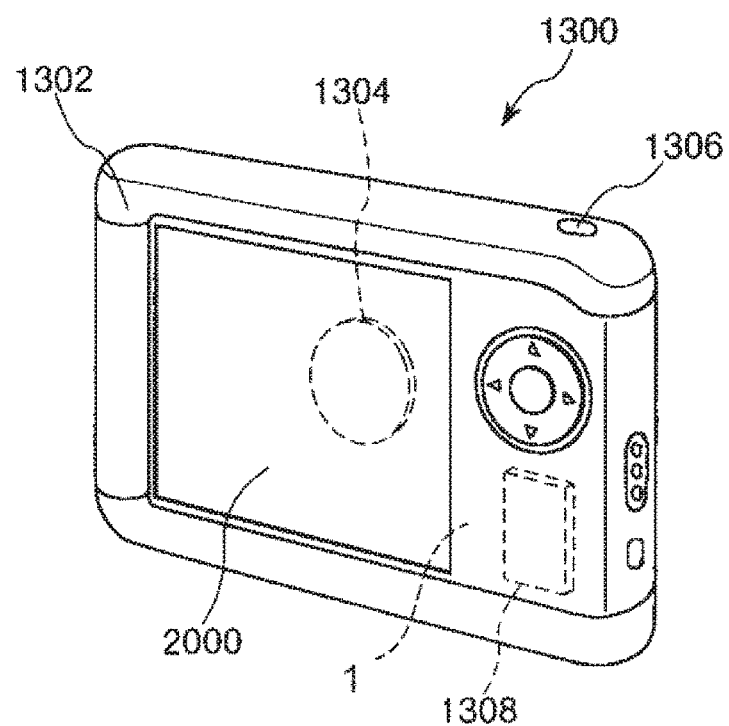
FIG. 35 is a perspective view illustrating a configuration of a digital still camera to which the electronic device according to the present application example is applied.

FIG. 35 is a perspective view illustrating a configuration of a digital still camera to which the electronic device according to the present application example is applied.

A display portion 2000 is disposed on a rear surface of a case (body) 1302 in a digital still camera 1300, and is configured to perform display, based on an imaging signal output from a CCD. The display portion 2000 function as a viewfinder for displaying a subject as an electronic image. A light receiving unit 1304 including an optical lens (imaging optical system) and the CCD is disposed on a front surface side (rear surface side in the drawing) of the case 1302. If an image capturer confirms a subject image displayed on the display portion 2000 and presses a shutter button 1306, the imaging signal of the CCD at that time is transferred and stored in a memory 1308. This digital still camera 1300 is internally equipped with the vibration device (for example, the vibration device 1) according to the present application example.

This electronic device includes the vibration device (for example, the vibration device 1) according to the present application example. Therefore, it is possible to obtain an advantageous effect of the vibration device according to the present application example described above, and excellent characteristics can be achieved.

In addition to the personal computer in FIG. 33, the mobile phone in FIG. 34, and the electronic still camera in FIG. 35, for example, the electronic device according to the present application example is applicable to a smartphone, a tablet terminal, a timepiece (including a smart watch), an ink jet type ejecting device (for example, an ink jet printer), a laptop type personal computer, a television, a wearable terminal such as a head mounted display (HMD), a video camera, a video tape recorder, a car navigation device, a pager, an electronic diary (provided with a communication function), an electronic dictionary, a calculator, an electronic game machine, a word processor, a work station, a video phone, a monitor for crime prevention, an electronic binocular, a POS terminal, a medical device (for example, an electronic thermometer, a sphygmomanometer, a blood glucose meter, an electrocardiogram measuring device, an ultrasonic diagnostic apparatus, and an electronic endoscope), a fish finder, various measuring instruments, instruments for a vehicle terminal base station, meters and gauges (for example, meters and gauges of a vehicle, an aircraft, and a ship), a flight simulator, and a network server.

4. Vehicle

Next, a vehicle including the vibration device according to the present application example will be described.

Figure 36:
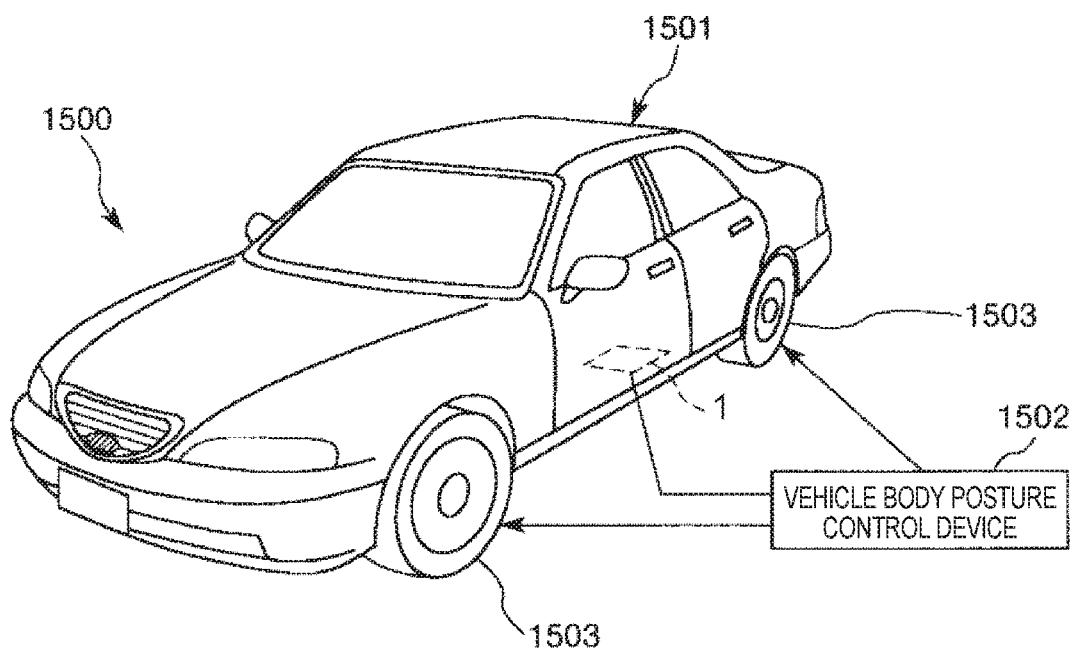
FIG. 36 is a perspective view illustrating a motor vehicle to which a vehicle according to the present application example is applied.

FIG. 36 is a perspective view illustrating a motor vehicle to which the vehicle according to the present application example is applied.

In this drawing, a motor vehicle 1500 has a vehicle body 1501 and four wheels 1503, and is configured so that the wheels 1503 are rotated by a power source (engine, not illustrated) disposed in the vehicle body 1501.

This motor vehicle 1500 is internally equipped with the vibration device (for example, the vibration device 1) according to the present application example. According to the vibration device (for example, the vibration device 1) of the present application example, it is possible to detect a posture or a movement direction of the vehicle body 1501. A detection signal of the vibration device (for example, the vibration device 1) according to the present application example is supplied to a vehicle body posture control device 1502. The vehicle body posture control device 1502 detects the posture of the vehicle body 1501, based on the signal of the vibration device. In this manner, it is possible to control hardness and softness of a suspension in accordance with the detection result, or to control a brake of an individual wheel 1503.

The vehicle including the vibration device (for example, the vibration device 1) according to the present application example is not limited to the motor vehicle. For example, the vehicle is also applicable to other motor vehicles such as motorcycles and railways, aircrafts, ships, spacecrafts, bipedal walking robots, or radio control helicopters.

The motor vehicle 1500 serving as an example of these vehicles has the vibration device (for example, the vibration device 1) according to the present application example. Therefore, it is possible to obtain an advantageous effect of the vibration device according to the present application example described above, and excellent characteristics can be achieved.

Hitherto, the vibration device, the angular velocity sensor, the electronic device, and the vehicle according to the invention have been described with reference to the accompanying drawings and the illustrated embodiments. However, the invention is not limited thereto. A configuration of each unit can be replaced with any desired configuration having the same function. Alternatively, any desired configuration may be added to the invention. The respective embodiments may be appropriately combined with each other.

The entire disclosure of Japanese Patent Application No. 2017-058170, filed Mar. 23, 2017 is expressly incorporated by reference herein.

What is claimed is:

1. A vibration device comprising:
a vibration element that has a plurality of terminals;
a base that has a plurality of electrical connection terminals; and
a board supporting the vibration element with respect to the base, the board having a main body that is flat plate-shaped, the board having a wiring member that is formed on the main body, the wiring member being electrically connected to the plurality of terminals of the vibration element and the plurality of electrical connection terminals of the base, the main body having:
a base fixing member that is fixed to the base;
a vibration element mounting member on which the vibration element is mounted; and
at least one beam that is connected between the base fixing member and the vibration element mounting member,
wherein the base fixing member, the vibration element mounting member, and the at least one beam of the main body are configured from a monolithic plate, and
wherein at least the one beam has a first portion which extends in a first direction and a second portion which extends in a second direction intersecting the first direction.

2. The vibration device according to claim 1,
wherein the board includes an insulating material.

3. The vibration device according to claim 1,
wherein the base is an electronic component which includes a circuit for driving the vibration element.

4. The vibration device according to claim 1,
wherein the base includes an electronic component which includes a circuit for driving the vibration element and a stress relaxation layer which has a wiring layer, and
the stress relaxation layer is disposed between the electronic component and the board, and the wiring is electrically connected between the electronic component and the wiring member of the board.

5. The vibration device according to claim 1,
wherein in the board, in a plan view, the base fixing member and the at least one beam configure a first frame body which surrounds the vibration element mounting member.

6. The vibration device according to claim 5,
wherein in the plan view, the board has a second frame body which is located between the first frame body and the vibration element mounting member.

7. The vibration device according to claim 1,
wherein the board has a plurality of the first portions and a plurality of the second portions, and
wherein the first portions and the second portions are alternately coupled to each other.

8. The vibration device according to claim 1,
wherein the wiring member of the board has shield wiring which is electrically connected to a constant potential.

9. An angular velocity sensor comprising:
the vibration device according to claim 1; and
a lid covering the base to form an inner space therein, wherein the vibration element disposed in the inner space is configured to detect an angular velocity based on a force applied to the vibration device.

10. An angular velocity sensor comprising:
the vibration device according to claim 2; and
a lid covering the base to form an inner space therein,
wherein the vibration element disposed in the inner space is configured to detect an angular velocity based on a force applied to the vibration device.

11. An angular velocity sensor comprising:
the vibration device according to claim 3; and
a lid covering the base to form an inner space therein,
wherein the vibration element disposed in the inner space is configured to detect an angular velocity based on a force applied to the vibration device.

12. An angular velocity sensor comprising:
the vibration device according to claim 4; and
a lid covering the base to form an inner space therein,
wherein the vibration element disposed in the inner space is configured to detect an angular velocity based on a force applied to the vibration device.

13. An electronic device comprising:
the vibration device according to claim 1;
a display; and
a case housing the vibration device and the display,
wherein the vibration element is configured to detect a physical quantity based on a force applied to the electronic device.

14. An electronic device comprising:
the vibration device according to claim 2;
a case housing the vibration device and the display,
wherein the vibration element is configured to detect a physical quantity based on a force applied to the electronic device.

15. An electronic device comprising:
the vibration device according to claim 3;
a display; and
a case housing the vibration device and the display,
wherein the vibration element is configured to detect a physical quantity based on a force applied to the electronic device.

16. An electronic device comprising:
the vibration device according to claim 4;
a display; and
a case housing the vibration device and the display,
wherein the vibration element is configured to detect a physical quantity based on a force applied to the electronic device.

17. A vehicle comprising:
the vibration device according to claim 1; and
a vehicle body housing the vibration device,
wherein the vibration element is configured to detect a physical quantity based on a force applied to the vehicle.

18. A vehicle comprising:
the vibration device according to claim 2; and
a vehicle body housing the vibration device,
wherein the vibration element is configured to detect a physical quantity based on a force applied to the vehicle.

19. A vehicle comprising:
the vibration device according to claim 3; and
a vehicle body housing the vibration device,
wherein the vibration element is configured to detect a physical quantity based on a force applied to the vehicle.

20. A vehicle comprising:
the vibration device according to claim 4; and
a vehicle body housing the vibration device,
wherein the vibration element is configured to detect a physical quantity based on a force applied to the vehicle.

* * * * *